(12) United States Patent
Hirotsune et al.

(10) Patent No.: US 6,312,779 B1
(45) Date of Patent: Nov. 6, 2001

(54) INFORMATION RECORDING MEDIUM AND INFORMATION RECORDING/REPRODUCING APPARATUS

(75) Inventors: Akemi Hirotsune, Higashimurayama; Makoto Miyamoto, Ome; Keikichi Andoo, Musashino; Junko Ushiyama, Kodaira; Yumiko Anzai, Ome; Hisae Wakabayashi, Toride; Tetsuya Nishida, Odawara; Motoyasu Terao, Hinode, all of (JP)

(73) Assignees: Hitachi, Ltd., Tokyo; Hitachi Maxell, Ltd., Osaka, both of (JP)

( * ) Notice: Subject to any disclaimer, the term of this patent is extended or adjusted under 35 U.S.C. 154(b) by 0 days.

(21) Appl. No.: 09/426,194

(22) Filed: Oct. 25, 1999

(30) Foreign Application Priority Data

Oct. 26, 1998 (JP) .................................................. 10-303617

(51) Int. Cl.$^7$ ........................................................ B32B 3/02
(52) U.S. Cl. ...................... 428/64.1; 428/64.4; 428/64.5; 428/64.6; 428/913; 430/270.13; 430/495.1; 430/945; 369/283; 369/288
(58) Field of Search ............................... 428/64.1, 64.2, 428/64.4, 64.5, 64.6, 457, 913; 430/270.13, 495.1, 945; 369/283, 288

(56) References Cited

U.S. PATENT DOCUMENTS

| | | | |
|---|---|---|---|
| 6,096,400 | * | 8/2000 | Inoue .................................. 428/64.1 |
| 6,153,063 | * | 8/2000 | Yamada ............................ 204/192.22 |

OTHER PUBLICATIONS

Yamada et al, "Phase–Change Optical Disks with High Speed Overwrite Ability", Shingaku Gihou, MR92–71, CPM92–148, Dec. 1992, pp. 37–42.

Okada et al, "Mark Edge Recording Characteristics on Phase Change Optical Disks", Shigaku Gihou, MR93–53, CPM93–104, Dec. 1993, pp. 1–6.

\* cited by examiner

Primary Examiner—Elizabeth Evans
(74) Attorney, Agent, or Firm—Mattingly, Stanger & Malur, P.C.

(57) ABSTRACT

An information recording medium which is composed of a substrate and a recording layer formed thereon to record information by means of the change in atomic arrangement induced by irradiation with light, said recording layer having at least one interface layer laminated at its interface. It is superior in recording-reproducing-rewriting characteristics and archival life.

12 Claims, 9 Drawing Sheets

INFORMATION RECORDING MEDIUM AND INFORMATION RECORDING/REPRODUCING APPARATUS

BACKGROUND OF THE INVENTION

The present invention relates to an information recording medium for optical disks and to a recording apparatus to make records thereon.

There are many known principles of recording information on a thin film (recording film) by irradiating it with a laser beam. One of them utilizes the phase transition (or phase change) of film material or the photo darkening, which are due to the change in atomic arrangement induced by irradiation with a laser beam. It offers the advantage of causing almost no deformation to the thin film and hence gives an information recording medium of double-sided disk structure which is formed by bonding together two disks.

Such an information recording medium is usually made up of a substrate, a protective layer, a recording film of GeSbTe or the like, a protective film of $ZnS-SiO_2$, and a reflective layer. The recording film is higher in reflectivity when it is in the crystalline state than when it is in the amorphous state. Therefore, the recording film has a greater absorptance when it is in the amorphous state. If over-write is carried out in this state, the amorphous region increases in temperature faster than the crystalline region due to recording and hence the newly formed record marks become large enough to distort reproduced signals.

Attempts have been made to eliminate this drawback by making the recording film to increase in absorptance more when it is in the crystalline state than when it is in the amorphous state. For example, literature (1) mentions the reversion of absorptance by providing a very thin (10 nm) reflective layer of Au. (Yamada and other three, Shingaku Gihou. MR92-71, CPM92-148 (1992-12) p. 37) Further, literature (2) mentions the reversion of absorptance by using a 65-nm thick silicon film as the reflective layer. (Okada and other six, Shingaku Gihou. MR93-53, CPM93-105 (1993-12) p. 1)

It is known from accelerated tests that the protective layer of this kind poses a problem with deterioration of record marks when high-density recording is carried out or when the recording medium is stored at room temperature or apparatus temperature for 10 years or more.

In this specification, the term "phase change" implies not only the phase change between the crystalline state and the amorphous state but also the phase change that takes place at the time of melting (change into liquid phase) and recrystallization and the phase change between the crystalline state and the crystalline state. The flow of the recording film occurs as the recording film flows due to irradiation with a laser beam at the time of recording and also as the recording film is gradually pushed by the deformation (thermal expansion) of the protective layer and intermediate layer. The term "mark edge recording" means the recording system which makes the edge of the record mark to correspond to the signal "1" and the space between marks and the mark inside to correspond to the signal "0".

Conventional information recording media suffer the disadvantage that jitter increases when rewriting is repeated frequently, record marks deteriorate during storage, and reflectivity level fluctuates in the case where they are used as high-density, rewritable information recording media of phase transition type that employ the mark edge recording system.

SUMMARY OF THE INVENTION

It is an object of the present invention to provide a new information recording medium which has good recording sensitivity, permits easy film forming, retains good recording and reproducing characteristics even after repeated rewriting, has a long archival life, and fluctuates less in reflectivity level than conventional ones.

The present invention is summarized below.

(1) An information recording medium which comprises a film of recording layer on a substrate to record information by means of the change in atomic arrangement induced by irradiation with light, said recording layer having at least one interface layer laminated at its interface.

(2) An information recording medium as defined in (1), wherein the interface layer contains nitrogen whose amount accounts for more than 10 atom % of the total atoms therein.

(3) An information recording medium as defined in (1) or (2), wherein it has at least another interface layer at the opposite side of said substrate.

(4) An information recording medium as defined in any of (1) to (3), which further comprises one protective layer between the substrate and said recording layer.

(5) An information recording medium as defined in any of (1) to (4), wherein it has a laminated absorptance control layer at the opposite side of the substrate to form said recording film thereon.

(6) An information recording medium as defined in any of (1) to (5), which has a track pitch $D_{tp}$ which is related with the wavelength $\lambda$ of laser for recording and the numerical aperture NA of the objective as follows.

$$0.5\lambda/NA \leq D_{tp} \leq 0.6\lambda/NA$$

(7) An information recording medium as defined in any of (1) to (6), wherein said interface layer has a composition represented by $N_sZ_t$, where $0.10 \leq s \leq 0.66$ and $s+t=1$, and Z denotes one or more members selected from H, Li, Na, K, Rb, Cs, Be, Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, B, Al, Ga, In, Tl, C, Si, Ge, Sn, Pb, P, As, Sb, Bi, O, S, Se, Te, F, Cl, and Br, and said recording film has a composition represented by

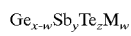

$$Ge_{x-w}Sb_yTe_zM_w$$

where $0.15 \leq x \leq 0.46$, $0.10 \leq y \leq 0.29$, $0.50 \leq z \leq 0.60$, $w \leq 0.10$ and $x+y+z=1$, and M is one member selected from Na, Mg, Al, P, S, Cl, Li, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Ag, Cr, W, Mo, Pt, Co, Ni, Pd, Si, Au, Cu, V, Mn, Fe, Ti, and Bi, $x+w-23 \leq s5 \leq x+w-19$, $22 \leq x+w \leq 36$, and $10 \leq s$.

(8) An information recording medium as defined in any of (5) to (7), wherein the absorptance control layer has a thickness in the range of 10 nm to 50 nm.

(9) An information recording medium as defined in any of (5) to (8), wherein the absorptance control layer is made of a material having a refractive index (n) of 1.2 to 6 and an attenuation factor (k) of 0.3 to 3.0.

(10) An information recording medium as defined in any of (5) to (9), wherein the reflectivity of crystalline state is lower than of amorphous state, and it needs a minimum power to be able to record a minimum mark in its amorphous state which is equal to or smaller than a minimum power to be able to record a minimum mark in its crystalline state under the same conditions.

(11) An information recording medium as defined in any of (5) to (10), wherein the interface layer contains a component identical with that of the absorptance control layer, said component being composed of more than 50% of the total number of atoms.

(12) An information recording medium as defined in any of (5) to (11), wherein it comprises at least one reflective layer made of Cu alloy, Al alloy, or Au alloy on the absorptance control layer.
(13) An information recording medium as defined in any of (5) to (12), which has at least one intermediate layer between the recording film and the absorptance control layer.
(14) An information recording apparatus having a laser emitter and an objective lens to make a record on the information recording medium defined in (5), which is characterized by that the information recording medium has a track pitch $D_{tp}$ which is related with the wavelength $\lambda$ of laser for recording and the numerical aperture NA of the objective lens as follows.

$$0.5\lambda/NA \leq D_{tp} \leq 0.6\lambda/NA$$

(15) Said interface layer has a composition represented by $(ZnS)_{30}(TaN)_{70}$.

TaN in $(ZnS)_{30}(TaN)_{70}$ may be replaced by any of Cr—N, Hf—N, and Nb—N without any change in the result. It may also be replaced by any of Mo—N, Ti—N, V—N, W—N, Y—N, Zr—N, Al—N, Ge—N, Si—N, and Zn—N without appreciable change in the result. The first six members have a high melting point and cause reflectivity to fluctuate only little at the time of rewriting. Al—N has a high thermal conductivity and permits frequent rewriting. Si—N can be produced at a low cost from an inexpensive target.

ZnS in $(ZnS)_{30}(TaN)_{70}$ may be replaced by any material composed of ZnS and less than 30 mol % of any of $SiO_2$, $Al_2O_3$, $Cr_2O_3$, and $Ta_2O_5$. It may also be replaced by any material composed of ZnS and less than 30 mol % of oxide such as SiO, $TiO_2$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $ZrO_2$, $Cu_2O$, and MgO. They have no adverse effect on the life.

Moreover, ZnS may be replaced partly or entirely by sulfide such as Ag—S, Co—S, Mo—S, and Ni—S without any change in the result.

$(ZnS)_{30}(TaN)_{70}$ constituting the interface layer may have TaN replaced by a boride such as Al—B, Ca—B, Co—B, Cr—B, Cu—B, Fe—B, Hf—B, La—B, Mo—B, Nb—B, Ni—B, Ta—B, Ti—B, V—B, W—B, Y—B, Tb—B, and Zr—B. In this case, boride increases noise more than nitride but extends the archival life. When nitride in the interface layer is replaced by boride, the amount (s) of boron in the interface layer is related with the archival life as mentioned above.

$(ZnS)_{30}(TaN)_{70}$ constituting the interface layer may have TaN replaced by a carbide such as Al—C, B—C, Ca—C, Cr—C, Hf—C, Mo—C, Nb—C, Si—C, Ta—C, V—C, W—C, and Zr—C. In this case, carbide increases time required for film making more than nitride but extends the archival life. When nitride in the interface layer is replaced by carbide, the amount (s) of carbon in the interface layer is related with the archival life as mentioned above.

$(ZnS)_{30}(TaN)_{70}$ constituting the interface layer may have TaN replaced by a silicide such as Ca—Si, Co—Si, Cr—Si, Hf—Si, Mo—Si, Nb—Si, Ni—Si, Pd—Si, Pt—Si, Ta—Si, V—Si, W—Si, and Zr—Si. In this case, silicide decreases the number of times of rewriting morethan nitride but extends thearchival life. When nitride in the interface layer is replaced by silicide, the amount (s) of silicon in the interface layer is related with the archival life as mentioned above.

The amount of the substituent material in the interface layer should preferably be such that the atoms constituting the substituent material account for more than 90% of all the atoms constituting the interface layer. If the amount of impurity other than the above-mentioned material exceeds 10 atom %, the resulting information recording medium is poor in rewriting characteristics, with the number of times of rewriting reduced by more than half.

(16) Said absorptance control layer should preferably have a thickness of 5 to 50 nm, more preferably 10 to 40 nm.

Said absorptance control layer should have a refractive index (n) of 1.2 to 6, preferably 1.8 to 5.5. In addition, said absorptance control layer should have an attenuation factor (k) of 0.3 to 3.0, preferably 0.5 to 2.

The absorptance control layer should be composed of Cr—$(Cr_2O_3)$. The amount of Cr in the absorptance control layer should preferably be greater than 15 mol %. If composed of Cr alone, the absorptance control layer has a greater thermal conductivity than that composed of $Cr_{40}(Cr_2O_3)_{60}$ and hence slightly decreases in recording sensitivity. Thus, the content of Cr should preferably be 22 to 43 mol %.

Cr—$(Cr_2O_3)$ constituting the absorptance control layer may have Cr replaced by any of Mo, W, Fe, Sb, Mn, Ti, Co, Ge, Pt, Ni, Nb, Pd, Be, and Ta without any change in performance. Of these substituent materials, Fe and W are preferable because of their high melting point. Pd and Pt are more preferable because of low reactivity with other layers, which leads to a larger number of times of rewriting. Ni and Co contribute to cost saving because they are obtained from inexpensive targets. Cr and Mo contribute to the life because of good corrosion resistance. Ti also contributes to good characteristics because of good corrosion resistance. Other materials that can be used include Tb, Gd, Sm, Cu, Au, Ag, Ca, Al, Zr, Ir, and Hf.

Cr—$(Cr_2O_3)$ constituting the absorptance control layer may have $Cr_2O_3$ replaced by any of oxides, sulfides, selenides, fluorides, borides, carbides, Si and Ge, which are exemplified below.

Oxides: $SiO_2$, SiO, $Al_2O_3$, BeO, $Bi_2O_3$, CoO, CaO, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $MoO_3$, NbO, $NbO_2$, NiO, PbO, PdO, SnO, $SnO_2$, $Sc_2O_3$, SrO, $ThO_2$, $TiO_2$, $Ti_2O_3$, TiO, $Ta_2O_5$, $TeO_2$, VO, $V_2O_3$, $VO_2$, $WO_2$, $WO_3$, $Y_2O_3$, and $ZrO_2$.
Sulfides: ZnS, $Sb_2S_3$, CdS, $In_2S_3$, $Ga_2S_3$, GeS, $SnS_2$, PbS, $Bi_2S3$, SrS, MgS, CrS, CeS, and $TaS_4$.
Selenides: $SnSe_2$, $Sb_2Se_3$, CdSe, ZnSe, $In_2Se_3$, $Ga_2Se_3$, GeSe, $GeSe_2$, SnSe, PbSe, and $Bi_2Se_3$.
Fluorides: $CeF_3$, $MgF_2$, $CaF_2$, $TiF_3$, $NiF_3$, $FeF_2$, and $FeF_3$.
Borides: $TiB_2$, $B_4C$, B, CrB, $HfB_2$, $TiB_2$, and WB.
Carbides: C, $Cr_3C_2$, $Cr_{23}C_6$, $Cr_7O_3$, $Fe_3C$, $MO_2C$, WC, $W_2C$, HfC, TaC, and $CaC_2$.
Any material having a composition similar to the above-mentioned one may be used. The above-mentioned materials may be used in combination with one another. Other materials that can be used include In—Sb, Ga—As, In—P, Ga—Sb, and In—As.

Of these materials, such oxides as $SiO_2$, $Ta_2O_5$, and $Y_2O_3$—$ZrO_2$ contribute to the saving of production cost because they permit the use of inexpensive targets. In addition, they have low reactivity and contribute to the number of times of rewriting. BeO is desirable because of high melting point. $Al_2O_3$ helps retain the rewriting characteristics better than others because of high thermal conductivity, particularly in the case of a disk without reflective layer. $Cr_2O_3$ is desirable because of high melting point and high thermal conductivity.

Sulfides and selenides reduce time required for film forming because of their great sputtering rate. Carbides increase the hardness of the absorptance control layer and hence prevent the recording film from flowing at the time of frequent rewriting.

With a metal element and/or dielectric material having a melting point higher than that (about 600° C.) of the recording film, it is possible to suppress the increase in jitter which would otherwise occur after rewriting 10,000 times. In this case, the increase in jitter will be smaller than 3%.

If the amount of the impurity element in the absorptance control layer exceeds 2 atom %, the jitter of front edge or rear edge exceeds 15% after rewriting 10 times. If the amount of the impurity element exceeds 5 atom %, the jitter exceeds 18%. Therefore, the amount of the impurity element in the absorptance control layer should be less than 5 atom %, preferably less than 2 atom %, so as to avoid the deterioration of rewriting characteristics.

The absorptance control layer should be made of Ta—N. The amount of Ta in the absorptance control layer should be larger than 37 atom %. If it is made entirely of Ta, it slightly lowers recording sensitivity because Ta is greater in thermal conductivity than Ta—N. Therefore, the amount of Ta should preferably be 45 to 56 mol %.

The above-mentioned Ta—N may be replaced by other nitrides such as AlN, BN, CrN, $Cr_2N$, GeN, HfN, $Si_3N_4$, Al—Si—N (such as $AlSiN_2$), Si—N, Si—O—N, TiN, and ZrN without any change in characteristics. If any of these nitrides is incorporated with less than 50 mol % of ZnS, the resulting material increases in adhesion strength.

(17) The above-mentioned protective layer should be made of $(ZnS)_{80}(SiO_2)_{20}$. $(ZnS)_{80}(SiO_2)_{20}$ may be replaced by a material composed of ZnS and $SiO_2$ in varied ratios. It may also be replaced by Si—N and Si—O—N materials, or any of oxides, nitrides, sulfides, selenides, and fluorides, which are exemplified below.

Oxides: $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, and MgO.

Nitrides: TaN, AlN, BN, $Si_3N_4$, GeN, and Al—Si—N (such as $AlSiN_2$).

Sulfides: ZnS, $Sb_2S_3$, CdS, $In_2S_3$, $Ga_2S_3$, GeS, $SnS_2$, PbS, and $Bi_2S_3$.

Selenides: $SnSe_2$, $Sb_2Se_3$, CdSe, ZnSe, $In_2Se_3$, $Ga_2Se_3$, GeSe, $GeSe_2$, SnSe, PbSe, and $Bi_2Se_3$.

Fluorides: $CeF_3$, $MgF_2$, and $CaF_2$.

Additional materials, such as Si, Ge, $TiB_2$, $B_4C$, B, and C, may also be used. Any material having a composition similar to the above-mentioned one may also be used. The above-mentioned materials may be used in combination with one another, for example, in the form of ZnS—$SiO_2$ and ZnS—$Al_2O_3$, as a single layer or multiple layers. Of these materials, ZnS is desirable because of its high refractive index (n) and its ability to give a high degree of modulation. A mixture of oxide and ZnS (more than 60 mol %) offers a combination of advantages of the high refractive index (n) of ZnS and the good chemical stability of oxide. Sulfides and selenides reduce time required for film forming because of their great sputtering rate. This holds true particularly for ZnS or a compound containing more than 80 mol % of ZnS.

These compounds should have a specific ratio of elements. For example, in the case of oxides, the ratio of metal element to oxygen should be 2:3 (for $Al_2O_3$, $Y_2O_3$, and $La_2O_3$), 1:2 (for $SiO_2$, $ZrO_2$, and $GeO_2$), and 2:5 (for $Ta_2O_5$), exactly or approximately. In the case of sulfides, the ratio of metal element to sulfur should be 1:1 (for ZnS), exactly or approximately. Deviation from the above-mentioned ratio should be less than ±10 atom %. For example, in the case of Al—O, the ratio of Al to O should not deviate more than ±10 atom % of Al from the ratio of $Al_2O_3$. In the case of Si—O, the ratio of Si to O should not deviate more than ±10 atom % of Si from the ratio of $SiO_2$. Deviation more than 10 atom % changes optical characteristics and hence lowers the degree of modulation by more than 10%.

The material (or the substitute for it) constituting the protective layer should account for more than 90% of the total number of atoms constituting the protective layer. If the amount of the impurity other than mentioned above exceeds 10 atom %, the number of times of rewriting decreases by more than half and the rewriting characteristics become poor.

The above-mentioned protective layer should have a total thickness of 60–140 nm, preferably 70–120 nm, so that it has a degree of modulation greater than 43% at the time of recording.

The protective layer should be composed of 2 or more layers, and the protective layer adjacent to the recording film should be made of $Cr_2O_3$. This $Cr_2O_3$ may be replaced by CoO, $GeO_2$, or NiO, a mixture thereof with $Cr_2O_3$. Alternatively, the $Cr_2O_3$ may be incorporated with $SiO_2$, $Ta_2O_5$, $Al_2O_3$, or $ZrO_2$—$Y_2O_3$. The resulting mixture has good crystallizing characteristics. These oxides have a low attenuation factor (k). This leads to a very low absorption at the lower interface layer, and this in turn leads to the advantage of high degree of modulation.

Nitrides (such as AlN, BN, CrN, $Cr_2N$, GeN, HfN, $Si_3N_4$, Al—Si—N (e.g., $AlSiN_4$), Si—N, Si—O—N, TaN, TiN, and ZrN) give high adhesion strength, making the information recording medium more resistant to external shocks. The composition for recording film has improved adhesion strength when it contains nitrogen.

In addition, oxides and carbides exemplified below or similar materials or mixtures thereof may also be used.

Oxides: BeO, $Bi_2O_3$, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $MoO_3$, NbO, $NbO_2$, PbO, PdO, SnO, $SnO_2$, $Sc_2O_3$, SrO, $ThO_2$, $TiO_2$, $Ti_2O_3$, TiO, $TeO_2$, VO, $V_2O_3$, $VO_2$, $WO_2$, and $WO_3$.

Carbides: C, $Cr_3C_2$, $Cr_{23}C_6$, $Cr_7O_3$, $Fe_3C$, $MO_2C$, WC, $W_2C$, HfC, TaC, and $CaC_2$.

The protective layer adjacent to the recording film should have a thickness of 2 to 25 nm, so as to ensure good recording and reproducing characteristics.

(18) The intermediate layer should be made of ZnS—$SiO_2$. The ZnS—$SiO_2$ of the intermediate layer may be replaced by Si—N and Si—O—N materials, or any of oxides, nitrides, sulfides, selenides, and fluorides, which are exemplified below.

Oxides: $Si_{O2}$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, and MgO.

Nitrides: TaN, AlN, BN, $Si_3N_4$, GeN, and Al—Si—N (such as $AlSiN_2$).

Sulfides: ZnS, $Sb_2S_3$, CdS, $In_2S_3$, $Ga_2S_3$, GeS, $SnS_2$, PbS, and $Bi_2S_3$.

Selenides: $SnSe_2$, $Sb_2Se_3$, CdSe, ZnSe, $In_2Se_3$, $Ga_2Se_3$, GeSe, $GeSe_2$, SnSe, PbSe, and $Bi_2Se_3$.

Fluorides: $CeF_3$, $MgF_2$, and $CaF_2$.

Additional materials, such as Si, Ge, $TiB_2$, $B_4C$, B, and C, may also be used. Any material having a composition similar to the above-mentioned one may also be used. The above-mentioned materials may be used in combination with one another, for example, in the form of ZnS—$SiO_2$ and ZnS—$Al_2O_3$, as a single layer or multiple layers. Of these materials, ZnS is desirable because of its high refractive index (n) and its ability to give a large degree of modulation. A mixture of oxide and ZnS (more than 60 mol %) offers a combination of advantages of the high refractive index (n) of ZnS and the good chemical stability of oxide.

Sulfides and selenides reduce time required for film forming because of their great sputtering rate. This holds true particularly for ZnS or a compound containing more than 80 mol % of ZnS.

These compounds should have a specific ratio of elements. For example, in the case of oxides, the ratio of metal element to oxygen should be 2:3 (for $Al_2O_3$, $Y_2O_3$, and $La_2O_3$), 1:2 (for $SiO_2$, $ZrO_2$, and $GeO_2$), and 2:5 (for $Ta_2O_5$), exactly or approximately. In the case of sulfides, the ratio of metal element to sulfur should be 1:1 (for ZnS), exactly or approximately. Deviation from the above-mentioned ratio should be less than ±10 atom %. For example, in the case of Al—O, the ratio of Al to O should not deviate more than ±10 atom % of Al from the ratio of $Al_2O_3$. In the case of Si—O, the ratio of Si to O should not deviate more than ±10 atom % of Si from the ratio of $SiO_2$. Deviation more than 10 atom % changes optical characteristics and hence lowers the degree of modulation by more than 10%.

The material (or the substitute for it) constituting the intermediate layer should account for more than 90% of the total number of atoms constituting the intermediate layer. If the amount of the impurity other than mentioned above exceeds 10 atom %, the number of times of rewriting decreases by more than half and the rewriting characteristics become poor.

(19) The reflective layer should be made of Al—Ti. The Al—Ti of the reflective layer may be replaced by any one material which is composed mainly of Al alloy, such as Al—Ag, Al—Cu, and Al—Cr. Al can also be used.

The aluminum alloy should contain other elements than aluminum in an amount of 0.5 to 4 atom %, preferably 1 to 2 atom %, so that the resulting information recording medium has good characteristic properties and a low bit error rate at the time of frequent rewriting. Similar results are obtained when other aluminum alloys than mentioned above are used.

The reflective layer may also be made of any metal, such as Au, Ag, Cu, Ni, Fe, Co, Cr, Ti, Pd, Pt, W, Ta, Mo, Sb, Bi, Dy, Cd, Mn, Mg, and V, in the form of simple substance, or any alloy, such as Au alloy, Ag alloy, Cu alloy, Pd alloy, and Pt alloy. Alternatively, it may be composed of layers of these alloys. Thus, the reflective layer is made of metal element, semimetal element, or alloy thereof, or a mixture thereof.

Of these materials, Cu, Al, Au, Cu alloy, Al alloy, and Au alloy are desirable because they have a high thermal conductivity and hence permit the disk to cool rapidly. This is advantageous for rewriting characteristics. Ag and Ag alloy produce the similar effect. As in the case of aluminum alloy, the content of elements other than Cu, Au, and Ag (as major constituents) should be 0.5 to 4 atom %, preferably 1 to 2 atom %, so that the resulting information recording medium has good characteristic properties and a low bit error rate at the time of frequent rewriting.

The material constituting the reflective layer should account for more than 95% of the total number of atoms constituting the reflective layer. If the amount of the impurity other than mentioned above exceeds 5 atom %, the number of times of rewriting decreases by more than half and the rewriting characteristics become poor.

The reflective layer should preferably have a thickness of 5 to 200 nm.

(20) The substrate should be a polycarbonate substrate having tracking grooves formed directly in the surface thereof. This substrate may be replaced by a chemically reinforced glass substrate whose surface is coated with a layer of polyolefin resin, epoxy resin, acrylic resin, or UV light curing resin.

The substrate having tracking grooves is one which has, on its entire surface or on part of its surface, grooves whose depth is greater than $\lambda/10n'$ (where $\lambda$ is the recording/reproducing wavelength and n' is a refractive index of the substrate material). Each groove may be formed continuously or intermittently in one round. When the groove depth is smaller than about $\lambda/6n'$, the level of crosstalk is low. When the groove depth is smaller than about $\lambda/3n'$, the level of crosserase is low, although the yields of substrates are somewhat poor.

The groove may vary in width from one place to another. The substrate may have no grooves (such as the one with sample servo format) or may have other tracking systems or other formats. The substrate may have a format which permits recording and reproducing at both the groove and the land. The substrate may also have a format which permits recording at either the groove or the land. The disk size is not limited to 12 cm; it may be 13 cm, 8 cm, 3.5 inch, or 2.5 inch. The disk thickness is not limited to 0.6 mm; it may be 1.2 mm or 0.8 mm.

In this example, two identical disks are made in the same way and they are bonded together with an adhesive, with their reflective layers 7 and 7' facing each other. The second disk may be replaced by another disk of different structure or a protective substrate. If the second disk or protective substrate has a high transmission in the region of UV light wavelength, then it can be bonded with a UV light curing resin. Any other method of bonding may be employed. In the case of a disk without the reflective layer 7, an adhesive may be applied to the uppermost layer.

In this example, two disks are prepared and they are bonded together with an adhesive 8, with their reflective layers 7 and 7' facing each other. If the reflective layers 7 and 7' of the two disks are coated with a UV light curing resin (about 10 $\mu$m thick) and the two disks are bonded together after curing, the resulting product will have a low error rate.

In this example, two disks are prepared and they are bonded together with an adhesive 8, with their reflective layers 7 and 7' facing each other. However, instead of bonding, the reflective layer 7 of the first disk may be coated with a UV light curing resin (about 10 $\mu$m thick or above).

In the case of a disk without the reflective layer 7, a UV light curing resin may be applied to the uppermost layer.

(21) The above-mentioned layers are specified for their thickness and material so as to achieve the desired recording and reproducing characteristics. The specified ranges may be combined to improve the effects further.

(22) The recording film should have a composition represented by $Ag_{3.5}Ge_{21}Sb_{22}Te_{53.5}$.

For the recording film to exhibit good characteristics, the composition should contain Ge in an amount of 15 to 36 atom %, preferably 18 to 28 atom %.

For the recording film to exhibit good characteristics, the composition should contain Sb in an amount of 10 to 29 atom %, preferably 15 to 26 atom %.

For the recording film to exhibit good characteristics, the composition should contain Te in an amount of 50 to 60 atom %, preferably 52 to 58 atom %.

For the recording film to exhibit good characteristics, the composition should contain Ag in an amount less than 10 atom %, preferably less than 6 atom %.

It is concluded from the foregoing that the recording film exhibits good characteristics when its composition as represented by the formula $Ge_{x-w}Sb_yTe_zM_w$ (where x+y+z=1) satisfies the following conditions.

$0.15 \leq x \leq 0.46$, $0.10 \leq y \leq 0.29$, $0.50 \leq z \leq 0.60$, and $0 \leq w \leq 0.10$, preferably $0.18 \leq x \leq 0.34$, $0.15 \leq y \leq 0.26$, $0.52 \leq z \leq 0.58$, and $0 \leq w \leq 0.06$.

The Ag in the recording film may be replaced by any of the following elements without increase in jitter at the time of frequent rewriting.

Na, Mg, Al, P, S, Cl, L, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Cr, W, Mo, Pt, Co, Ni, Pd, Si, Au, Cu, V, Mn, Fe, Ti, and Bi.

Of these elements, Ag is more effective than Ge—Sb—Te in increasing the recording sensitivity (by 10%). Any of Cr, W, and Mo (even if added alone) is more effective than Ge—Sb—Te in increasing the number of times of rewriting (by 3 times and above), with rewriting repeated to such an extent that jitter increases by more than 5%. When incorporated with at least one of Pt, Co, and Pd, the resulting recording film increases in crystallization temperature by more than 50° C. compared with that incorporated with Ge—Sb—Te.

If the amount of the impurity element in the recording film exceeds 2 atom %, the jitter of front edge or rear edge exceeds 15% after rewriting 10 times. If the amount of the impurity element exceeds 5 atom %, the jitter exceeds 18%. Therefore, the amount of the impurity element in the recording film should be less than 5 atom %, preferably less than 2 atom %, so as to avoid the deterioration of rewriting characteristics.

The recording film should have a thickness of 6 to 25 nm, preferably 7 to 20 nm.

The recording film improves in adhesion properties and other characteristic properties, if the interface between it and its adjacent layer contains nitrogen. This is accomplished by introducing nitrogen into the sputtering gas at the initial or last stage of the film forming process or by using a target containing a small amount of nitrogen. (The first method may extend time required to form the recording film.)

DETAILED DESCRIPTION OF THE INVENTION

The invention will be described in more detail with reference to the following examples.

EXAMPLE 1

[Structure and production of the information recording medium pertaining to the present invention]

Figure 1:
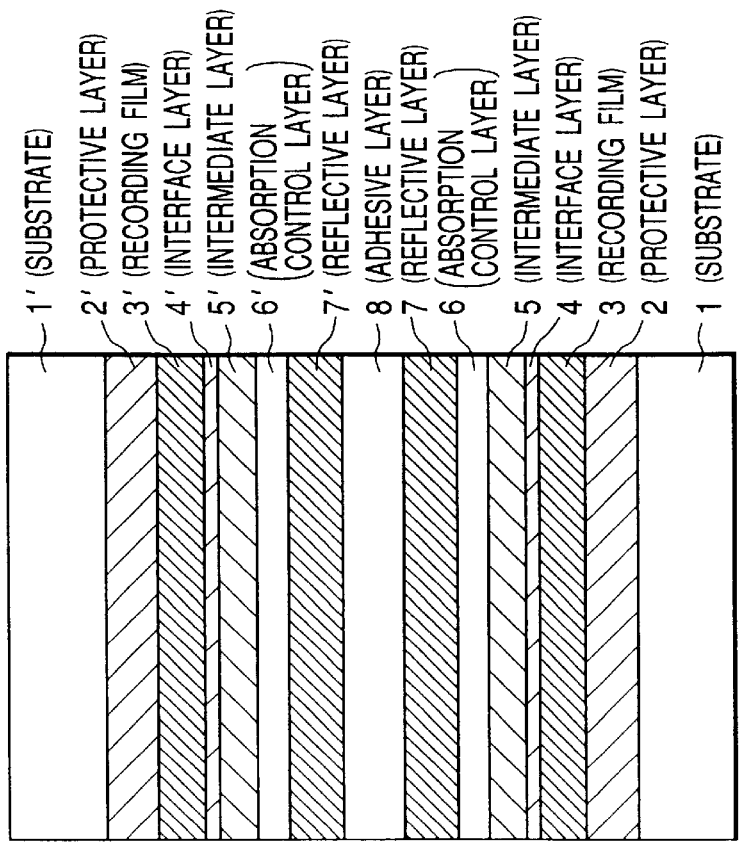
FIG. 1 is a sectional view showing the structure of the information recording medium in Example 1 of the present invention.

FIG. 1 shows in section the structure of the disk-like information recording medium of the present invention. This recording medium was produced as follows.

A polycarbonate substrate 1 was made ready which is 12 cm in diameter and 0.6 mm in thickness and has tracking grooves in its surface. On the substrate 1 the following layers or films were formed in order by means of a magnetron sputtering apparatus.

A protective layer 2 which is composed of an approximately 85-nm thick film of $(ZnS)_{80}(SiO_2)_{20}$ and an approximately 10-nm thick film of $Cr_2O_3$.

An approximately 10-nm thick recording film 3 of $Ag_{3.5}Ge_{21}Sb_{22}Te_{53.5}$.

An approximately 10-nm thick interface layer 4 of $(ZnS)_{30}(TaN)_{70}$.

An approximately 145-nm thick intermediate layer 5 of $(ZnS)_{80}(SiO_2)_{20}$.

An approximately 30-nm thick absorptance control layer 6 of $Cr_{27}(Cr_2O_3)_{73}$.

An approximately 85-nm thick reflective layer 7 of $Al_{98}Ti_2$.

In this way there was obtained a first disk.

The same procedure as above was repeated to give a second disk which has the same structure as the first disk.

The second disk was prepared as follows. On the polycarbonate substrate 1' the following layers or films were formed in order.

A protective layer 2' which is composed of an approximately 85-nm thick film of $(ZnS)_{80}(SiO_2)_{20}$ and an approximately 10-nm thick film of $Cr_2O_3$.

An approximately 10-nm thick recording film 3' of $Ag_{3.5}Ge_{21}Sb_{22}Te_{53.5}$.

An approximately 10-nm thick interface layer 4' of $(ZnS)_{30}(TaN)_{70}$.

An approximately 145-nm thick intermediate layer 5' of $(ZnS)_{80}(SiO_2)_{20}$.

An approximately 30-nm thick absorptance control layer 6' of $Cr_{27}(Cr_2O_3)_{73}$.

An approximately 85-nm thick reflective layer 7' of $Al_{98}Ti_2$.

The first and second disks were bonded together with an adhesive layer 8, with the reflective layers 7 and 7' facing each other. In this way there was obtained a disk-like information recording medium, as shown in FIG. 1.

[Structure and production of conventional information recording medium]

The effect of the interface layer was evaluated by comparing the disk-like information recording medium obtained as above with the conventional disk-like information recording medium without interface layer which was prepared as follows.

A polycarbonate substrate 1 was made ready which is 12 cm in diameter and 0.6 mm in thickness and has tracking grooves in its surface. On the substrate the following layers or films were formed in order by means of a magnetron sputtering apparatus.

- A protective layer 2 which is composed of an approximately 85-nm thick film of $(ZnS)_{80}(SiO_2)_{20}$ and an approximately 10-nm thick film of $Cr_2O_3$.
- An approximately 10-nm thick recording film 3 of $Ag_{3.5}Ge_{21}Sb_{22}Te_{53.5}$.
- An approximately 155-nm thick intermediate layer 5 of $(ZnS)_{80}(SiO_2)_{20}$.
- An approximately 30-nm thick absorptance control layer 6 of $Cr_{27}(Cr_2O_3)_{73}$.
- An approximately 85-nm thick reflective layer 7 of $Al_{98}Ti_2$.

Figure 2:
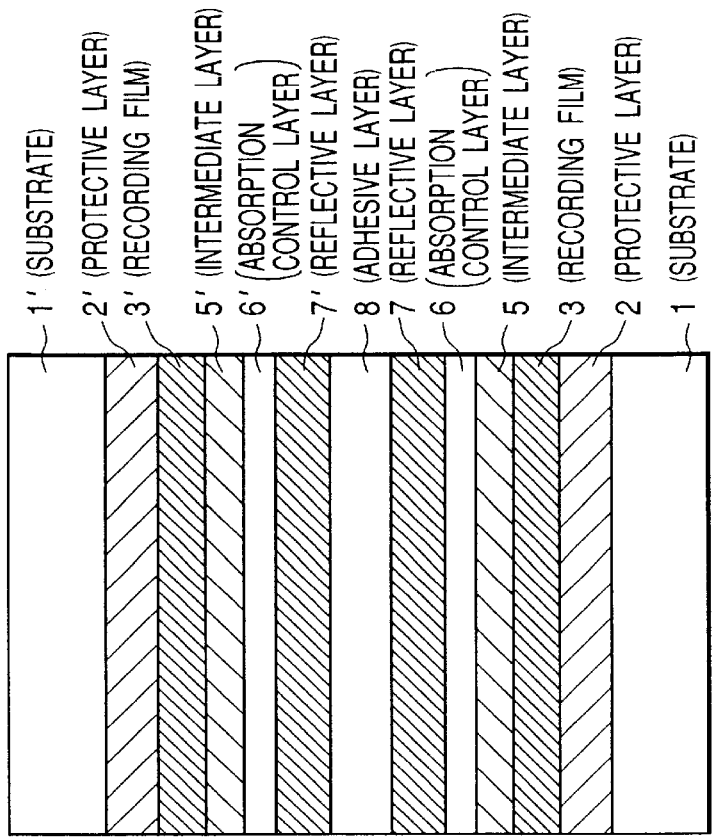
FIG. 2 is a sectional view showing the structure of the conventional information recording medium.

The conventional information recording medium has the intermediate layer which is made thicker to compensate for the absence of the interface layer, so that it has the same reflectivity (in the crystalline state) as the information recording medium pertaining to the present invention. In this way there was obtained a first disk. A second disk was prepared in the same way as above. The thus obtained two disks were bonded together to give the disk-like information recording medium as shown in FIG. 2.

[Initial crystallization]

The recording medium prepared as mentioned above underwent the following process for the initial crystallization of the recording films 3 and 3'. The procedure for the recording film 3 is explained below, and the same procedure was applied to the recording film 3'.

With the recording medium turning such that a point on the recording track ran at a linear velocity of 8 m/s, the recording film 3 was irradiated through the substrate 1 with semiconductor laser (with a wavelength of 810 nm) at a power of 800 mW. The laser beam produced an elliptic spot elongated in the radial direction of the recording medium. The spot was moved in increments of one quarter of the spot length in the radial direction of the recording medium. In this way the initial crystallization was carried out. This procedure was repeated three times (although no repetition is necessary) so as to suppress the increase of noise due to initial crystallization. The advantage of the initial crystallization in this way lies in speed.

[Recording, erasing, and reproducing]

Figure 11:
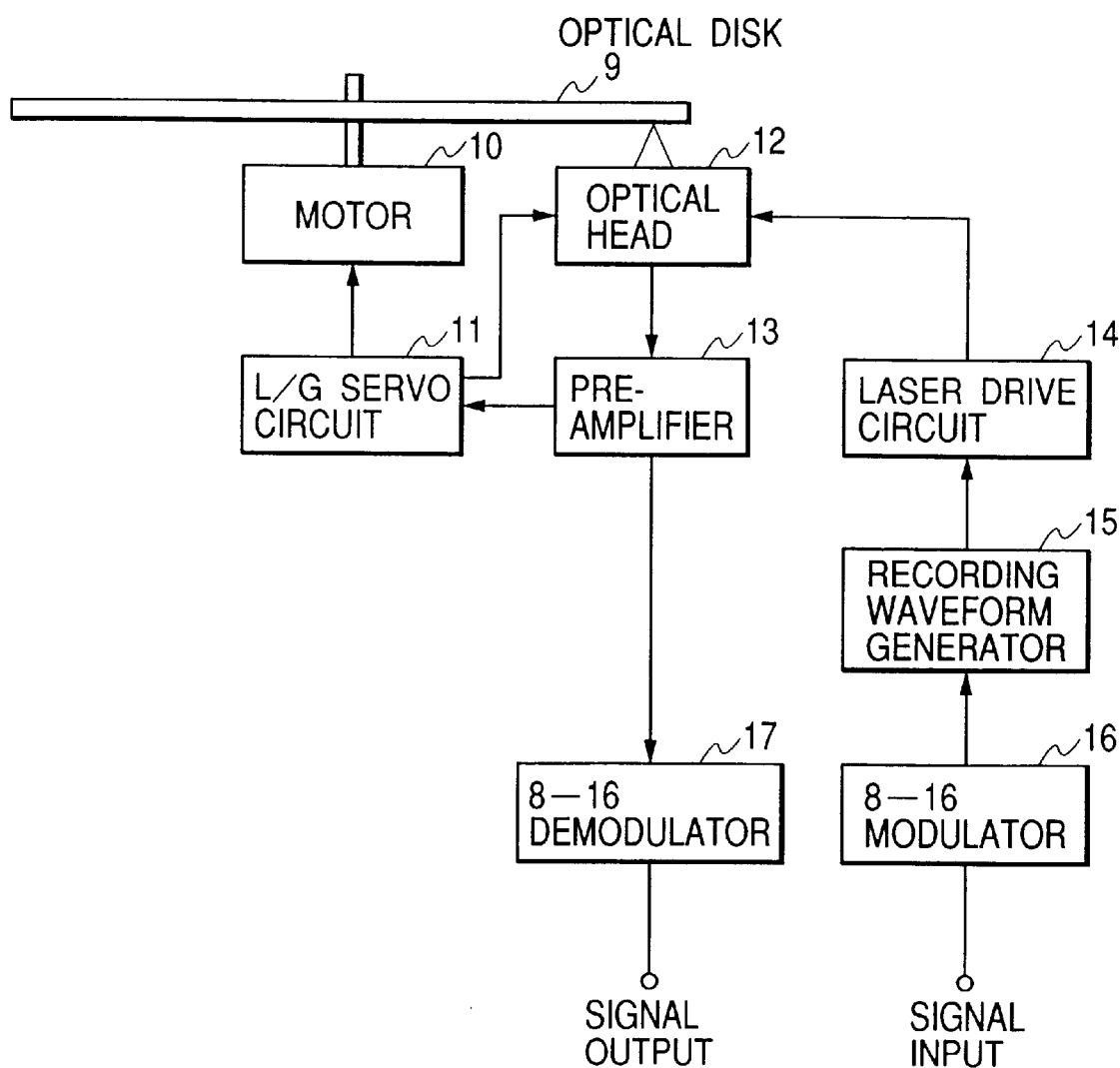
FIG. 11 is a recording/reproducing apparatus for the information recording medium of the present invention.

The recording medium was subjected to information recording and reproducing using the information recording and reproducing apparatus as shown in FIG. 11. The optical disk 9 which had undergone initial crystallization was turned. The recording region of the recording film 3 was irradiated with a recording laser beam capable of tracking and automatic focusing. The power of the laser beam was changed between the medium level Pe (4.5 mW) and high level Ph (11 mW) so as to record information. The number of rotations of the disk was controlled by the motor 10 according to the ZCLV (zone constant linear velocity) method. This method permits the speed to vary for each zone for recording and reproducing. The linear velocity of the disk was about 8.3 m/s.

Information from the outside of the recording apparatus is transmitted to the 8–16 modulator (8 bits as 1 unit). Recording on the optical disk 9 was accomplished by the so-called 8–16 modulation system which is designed to convert 8-bit information to 16-bit information. This modulation system records information with mark lengths of 3T–14T corresponding to 8-bit information. This modulation is accomplished by the 8–16 modulator 16 shown in FIG. 11. "T" represents the period of clock at the time of information recording. It is 17.1 ns in this example.

Figure 3:
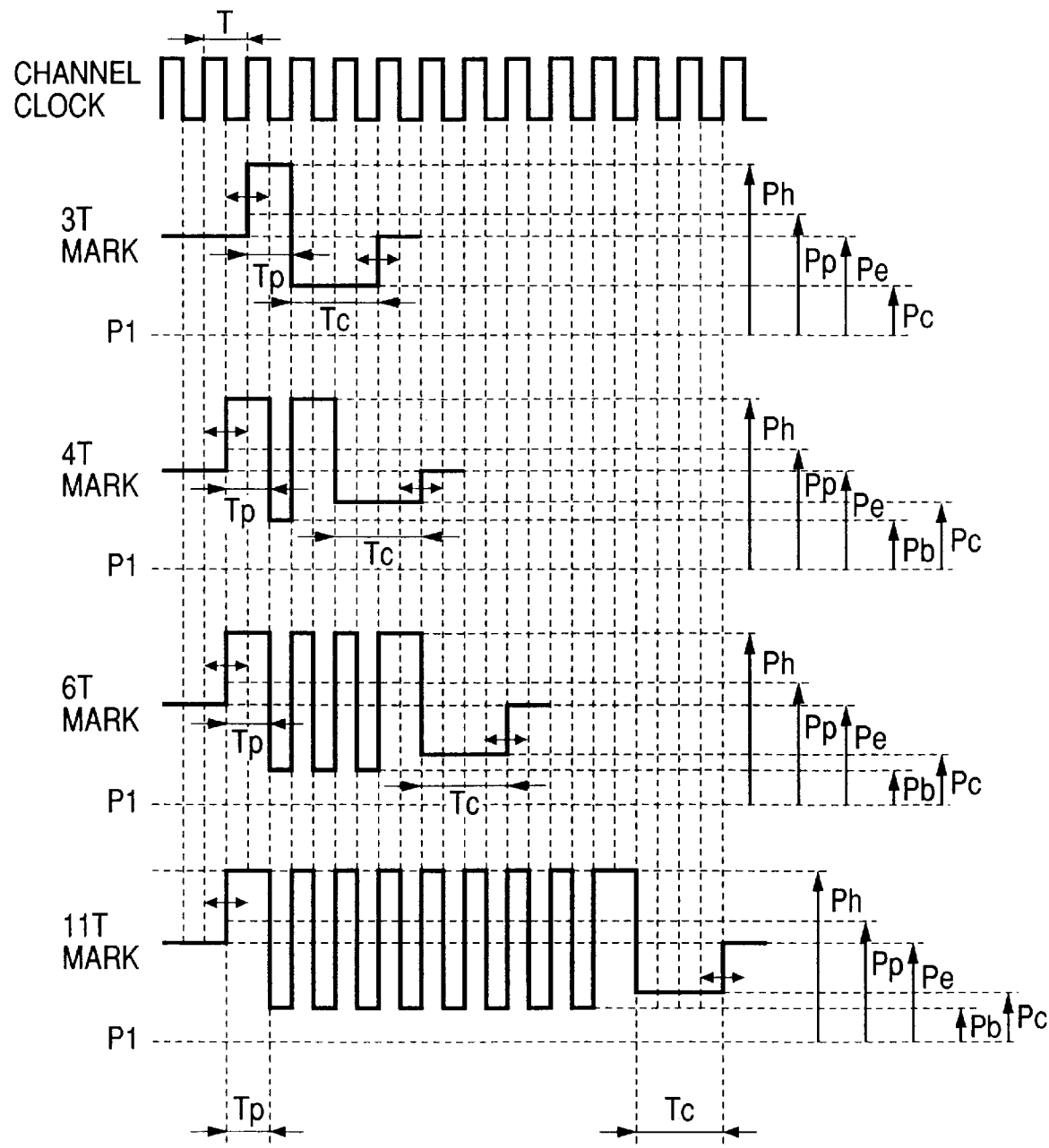
FIG. 3 is a diagram showing waveforms recorded to evaluate the recording/reproducing characteristics of the information recording medium pertaining to the present invention.

After conversion by the 8–16 modulator 16, digital signals of 3T–14T are transmitted to the recording waveform generator 15, so that the recording waveform is formed as shown in FIG. 3.

The recording waveform generated by the recording waveform generator 15 is transmitted to the laser drive circuit 14, which in turn actuates the semiconductor laser in the optical head 12 in response to the recording waveform.

The optical head 12 mounted on the recording apparatus is a semiconductor laser to emit a recording beam (660 nm in wavelength). The laser beam is focused on the recording layer of the optical disk 9 by the objective lens with a numerical aperture of 0.6. Thus, the laser beam having an energy corresponding to the recording waveform is directed to the recording layer. In this way the recording of information was accomplished.

The recording apparatus accords with the so-called land-groove recording system which is designed to record information in both groove and land (region between grooves). This recording apparatus has the L/G servo circuit 11 to select tracking for land or groove. For a disk designed for different tracking system, the L/G servo circuit is replaced by any servo circuit suitable for the tracking system in question.

Reproduction of recorded information was carried out by means of the above-mentioned optical head 12. The laser beam is directed to marks (formed by recording), and reflections from the marks and other parts is detected so as to obtain reproduced signals. The reproduced signals are amplified by the pre-amplifier 13 and the amplified signals are transferred to the 8–16 demodulator 17, in which each 16 bits are converted into 8-bit information. A series of steps mentioned above completes the reproduction of information.

The recording waveform generator 15 makes the signals of 3T–14T correspond to "0" and "1" alternately and sequentially. At "0", a series of laser pulses with a medium power level are emitted, and at "1", a series of laser pulses with a high power level are emitted. The recording laser beam forms an amorphous part in the recording region. This recording medium differs in reflectivity from one part to another. In other words, crystalline parts are higher in reflectivity than amorphous parts formed by recording.

The laser beam to make record marks varies in output power. That is, it has a high power level of 11.0 mW, a medium power level of 4.0 mW, and a cooling power level of 3.0 mW. In the case of recording laser beam, the ratio of power at high level to power at medium level should preferably be from 1:0.3 to 1:0.6. The power level may be varied at short time intervals. The resulting waveform is shown in FIG. 3. While one record mark is being formed, power is repeatedly reduced to the bottom power level Pb, which is lower than the medium power level, in every half the window width (Tw/2). The cooling power level Pc completes one cycle of the recording pulses. Recording and reproducing in this way give reproduced signal waveforms with a low jitter value and a low error rate. The cooling power level is lower than the medium power level and higher than or equal to the bottom power level. This waveform is characterized by that the first pulse width Tp varies depending on the record mark and the length of the space placed immediately before the record mark. It is also characterized by that the cooling pulse width Tc (time interval required for the recording pulse to finally reach the Pc level) is determined by the record mark and the length of the space that follows the record mark. The shorter the space before the mark and the longer the mark, the longer the Tp. The longer the space before the mark and the shorter the mark, the longer the Tp. When the Tp of the recording waveform for the 6 Tw mark is extended extraordinarily, a significant effect of reducing jitter is obtained. (This depends on the structure of the recording medium.) The longer the succeeding space and the longer the mark, the shorter the Tc. The shorter the succeeding space and the shorter the mark, the longer the Tc. As mentioned above, the recording waveform generator 15 produces a series of high-power pulses including high-power level to form the mark. In this process, it varies the first pulse width and the last pulse width of the multipulse waveform according to the length of the space before and after the mark. (This is referred to as adaptive control of recording waveform.) Therefore, it has the multipulse waveform table corresponding to this control system. The multipulse recording waveform thus produced eliminates the effect of thermal buffer between marks.

FIG. 3 only shows the recording waveforms of 3 Tw, 4 Tw, 6 Tw, and 11 Tw. The waveform of 5 Tw is obtained from the waveform of 6 Tw by eliminating one high power level Ph of Tw/2 from a series of pulses of high power level and also eliminating one bottom power level of Tw/2 that follows immediately. The waveforms of 7 Tw–10 Tw are obtained from the waveform of 6 Tw by adding one set each of high power level Ph of Tw/2 and bottom power level Pb of Tw/2 to the front of the last pulse of high power level. Thus, the waveform of 11 Tw is obtained by adding 5 sets. The shortest length of the record mark corresponding to 3 Tw was 0.42 μm. On passing through the part for recording, the laser beam decreases in power to the lower power level Pr (1.0 mW) for reproduction (reading). The recording signal contains dummy data (such as repetition of 4T marks and 4T spaces) at the start and end of the information signal. VFO is also present at the start.

The recording system like this permits new information to be recorded by overwriting without the necessity of erasing the information which has been recorded already, and the recorded information is replaced by new information. In other words, it permits overwriting with a single, nearly round light spot.

The above-mentioned recording method may be modified as follows. While the disk is rotating for rewriting (before it completes the first one rotation or several rotations), the power-modulated recording laser beam at a medium power level (4.5 mW) or at a power level close to it is directed continuously, so that the recorded information is erased once. In the next one rotation, the laser beam modulated according to the information signal is directed so as to make record. This modulated laser beam is at an intermediate level between the bottom power level (1.2 mW) and the high power level (11 mW) or at an intermediate level between the medium power level (4.5 mW) and the high power level (11 mW). The advantage of recording information after erasure of previous information is that only a small portion of previous information remains unerased. This facilitates rewriting even when the linear velocity is doubled.

The above-mentioned recording method may be effectively applied to not only the recording film of the media pertaining to the present invention but also the recording film of any other media.

[Effect of interface layer]

Figure 4:
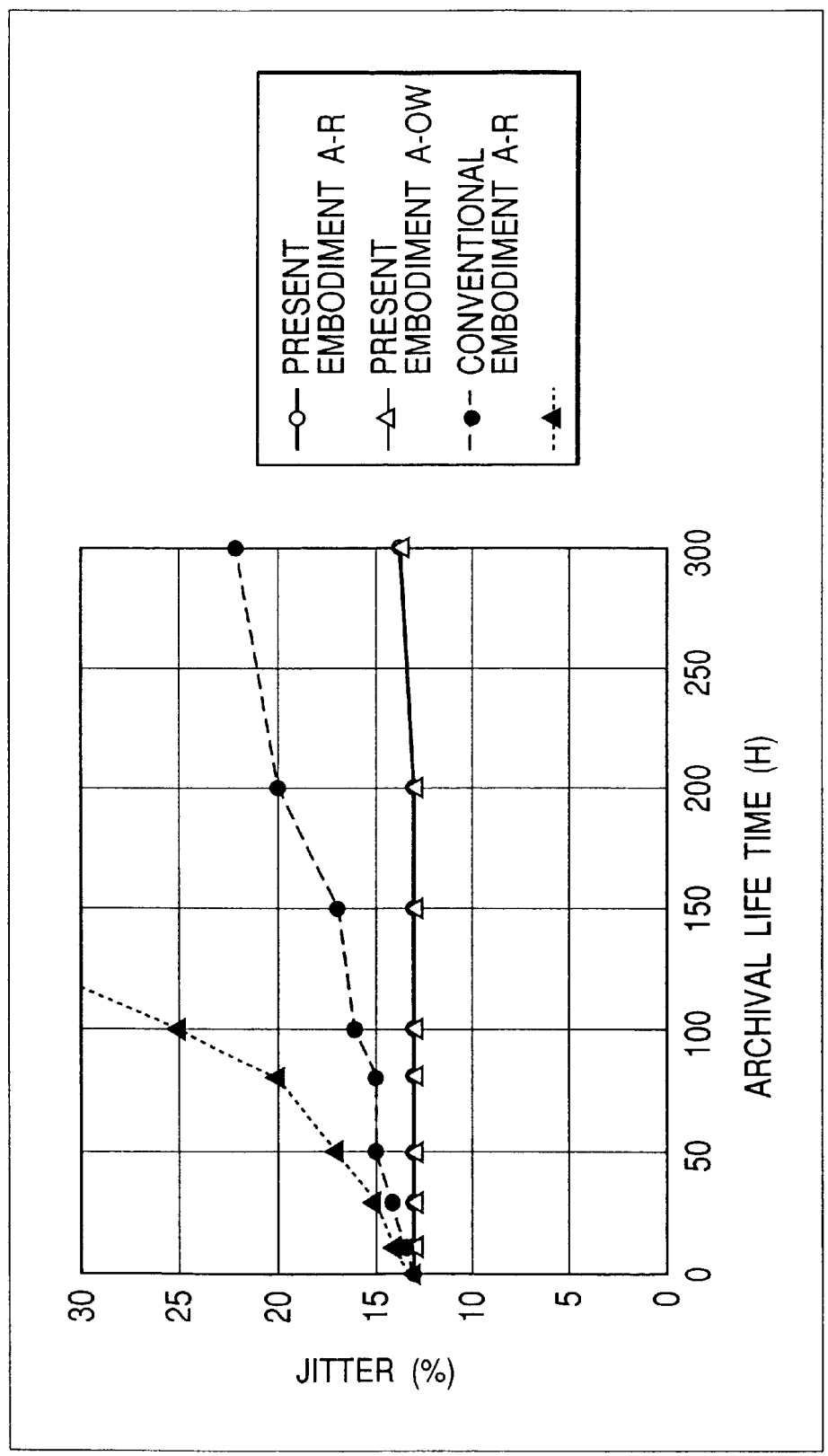
FIG. 4 is a graph showing the archival life characteristics of the information recording medium pertaining to the present invention and the archival life characteristics of the information recording medium of conventional structure.

The disk A (FIG. 1) having the interface layer mentioned in this example was compared with the conventional disk B (FIG. 2) having no interface layer in archival life (reproducing archival life: A—R, and overwrite archival life: A—OW). The results are shown in FIG. 4. The archival life was evaluated by accelerated test at a constant temperature (90° C.). The term "jitter" is an indication which denotes the extent to which the reproduced signal fluctuates with respect to the window width (Tw) when the position of the edge of the record mark is reproduced. As the jitter value increases, the detected position of the edge occupies the window width almost entirely, and this prevents accurate reproduction of recorded signals. Therefore, the jitter value should preferably be as small as possible. The measurement of jitter was performed on records which were randomly made with the window width (Tw) of 17.1 ns, the shortest recording signal of 3 Tw, and the longest recording signal of 11 Tw. A reproduced signal equalizing circuit was used for measurement.

The archival life was measured as follows. First, EFM signals are recorded and their jitter is measured. The specimen is allowed to stand in an environment for accelerating test. Jitter is measured against room temperature. The archival life is expressed in terms of change in jitter. The overwrite archival life was measured as follows. First, EFM signals are rewritten 10 times and jitter is measured. Then, the specimen is allowed to stand in an environment for accelerated test. Overwriting is made once on the same track, and jitter is measured again. The results are shown below.

| | Disk A | | Disk B | |
| --- | --- | --- | --- | --- |
| Accelerated test Time (h) | A-R Jitter (%) | A-OW jitter (%) | A-R jitter (%) | A-OW jitter (%) |
| 0   | 13 | 13 | 13 | 13 |
| 10  | 13 | 13 | 13 | 14 |
| 30  | 13 | 13 | 14 | 15 |
| 50  | 13 | 13 | 15 | 17 |
| 80  | 13 | 13 | 15 | 20 |
| 100 | 13 | 13 | 16 | 25 |
| 150 | 13 | 13 | 17 | 38 |
| 200 | 13 | 13 | 20 | — |
| 300 | 14 | 14 | 22 | — |

It is noted that the interface layer prevents the increase of jitter and greatly improve the archival life in the environment for accelerated test.

[Material of interface layer]

Several kinds of interface layers 4 and 4' were prepared from different materials, each composed of ZnS and TaN in varied ratios. The resulting specimens underwent accelerated test for archival life. The results are shown below in terms of the duration of the accelerated test in which the jitter of A—R and A—OW increased by less than 2%.

| Composition | A-R (h) | A-OW (h) |
| --- | --- | --- |
| (ZnS) | — | 10 |
| $(ZnS)_{90}(TaN)_{10}$ | — | 40 |
| $(ZnS)_{80}(TaN)_{20}$ | — | 100 |
| $(ZnS)_{70}(TaN)_{30}$ | — | 150 |
| $(ZnS)_{50}(TaN)_{50}$ | — | 200 |
| $(ZnS)_{40}(TaN)_{60}$ | longer than 300 | 300 |

-continued

| Composition | A-R (h) | A-OW (h) |
|---|---|---|
| $(ZnS)_{30}(TaN)_{70}$ | longer than 300 | longer than 300 |
| $(ZnS)_{20}(TaN)_{80}$ | 300 | longer than 300 |
| $(ZnS)_{10}(TaN)_{90}$ | 200 | — |
| (TaN) | 100 | — |

It is noted that A—OW jitter and A—R jitter are reduced and hence the archival life is improved if the composition for the interface layer contains an adequate amount (s) of nitrogen. The amount of N in the total component of the interface layer should preferably be more than 10 atom %, more preferably 15 to 50 atom %. The amount of N was determined by Rutherford backscattering spectrometry.

Interface layers 4 and 4' were prepared from Cr—N, Hf—N, or Nb—N in place of $(ZnS)_{30}(TaN)_{70}$. The same results as above were obtained.

Good characteristic properties were obtained when the interface layers are prepared from any of Mo—N, Ti—N, V—N, W—N, Y—N, Zr—N, Al—N, Ge—N, Si—N, and Zn—N. Of these materials, Mo—N, Ti—N, V—N, W—N, Y—N, and Zr—N have a high molting point and gave a reflectivity which fluctuates less at the time of rewriting. Al—N has a high thermal conductivity and permits rewriting a larger number of times. Si—N leads to a low production cost because it: is produced from an inexpensive target.

The $(ZnS)_{30}(TaN)_{70}$ used for the interface layers 4 and 4' may be replaced by a mixture of TaN and any of $SiO_2$, $Al_2O_3$, $Cr_2O_3$, and $Ta_2O_5$, in an amount less than 30 mol %. These oxides may be used in combination with another oxide such as SiO, $TiO_2$, $Y_2O_3$, $CeO_2$, $La_2O_3$, $In_2O_3$, GeO, $GeO_2$, Pbo, SnO, $SnO_2$, BeO, $Bi_2O_3$, $TeO_2$, $WO_2$, $WO_3$, $Sc_2O_3$, $ZrO_2$, $Cu_2O$, and MgO. They do not affect the life so long as their amount is less than 30 mol %.

The same result as above was obtained even when the ZnS is replaced partly or entirely by a sulfide such as Ag—S, Co—S, and Ni—S.

The $(ZnS)_{30}(TaN)_{70}$ used for the interface layers 4 and 4' may be replaced by a mixture of ZnS and a boride such as Al—B, Ca—B, Co—B, Cr—B, Cu—B, Fe—B, Hf—B, La—B, Mo—B, Nb—B, Ni—B, Ta—B, Ti—B, V—B, W—B, Y—B, Tb—B, and Zr—B. In this case, boride increases noise more than nitride but extends the archival life. When nitride in the interface layer is replaced by boride, the amount (s) of boron in the interface layer is related with the archival life as mentioned above.

The $(ZnS)_{30}(TaN)_{70}$ used for the interface layers 4 and 4' may be replaced by a mixture of ZnS and a carbide such as Al—C, B—C, Ca—C, Cr—C, Hf—C, Mo—C, Nb—C, Si—C, Ta—C, V—C, W—C, and Zr—C. In this case, carbide increases time required for film making more than nitride but extends the archival life. When nitride in the interface layer is replaced by carbide, the amount (s) of carbon in the interface layer is related with the archival life as mentioned above.

The $(ZnS)_{30}(TaN)_{70}$ used for the interface layers 4 and 4' may be replaced by a mixture of ZnS and a silicide such as Ca—Si, Co—Si, Cr—Si, Hf—Si, Mo—Si, Nb—Si, Ni—Si, Pd—Si, Pt—Si, Ta—Si, V—Si, W—Si, and Zr—Si. In this case, silicide decreases the number of times of rewriting more than nitride but extends the archival life. When nitride in the interface layer is replaced by silicide, the amount (s) of silicon in the interface layer is related with the archival life as mentioned above.

The material (or the substitute for it) constituting the interface layer 4 should account for more than 90% of the total number of atoms constituting the interface layer. If the amount of the impurity other than mentioned above exceeds 10 atom %, the number of times of rewriting decreases by more than half and the rewriting characteristics become poor.

[Absorptance control layer]

The information recording medium in this example shows a jitter ($\sigma$/Tw) which is smaller by 4% or above than that of the information recording medium (without absorptance control layer) in Example 2, when recording and erasing are repeated. The reduction of jitter is due to the fact that absorptance is controlled by the absorptance control layer and erasure is almost complete during recording even at a high linear velocity.

The record mark was observed under a transmission electron microscope so as to compare the mark size (area) produced by overwriting on a long mark (in the amorphous state) with the mark size produced by overwriting on a long space (in the crystalline state). It was found that the former is almost the same as the latter in the case of the information recording medium in this example. However, in the case where the absorptance is strongly controlled, the former was slightly smaller than the latter. On the other hand, in the case of the information recording medium in Example 2, the former is larger than the latter.

It is generally said that in the case where information is recorded on an information recording medium, one specific part in the recording medium should be able to record information about 100,000 times. Therefore, the specimens in this examples were examined for recording and reproducing characteristics by repeating rewriting 100,000 times.

The absorptance control layer is effective also in other recording systems, and it is particularly effective in accurately recording the edge and reducing the jitter in mark edge recording. ("Mark edge recording" is a recording system by which the signal at the edge of the record mark is made to correspond to the signal "1" and the signal at the space between marks and in the mark is made to correspond to the signal "0".) It is also effective in the region where the linear velocity is greater than 6 m/s.

[Thickness of absorptance control layer]

In this example, specimens differing in the thickness of the absorptance control layers 6 and 6' were prepared, and they were examined for jitter ($\sigma$/Tw) after rewriting 10 times. The results are as follows.

The table below shows the jitter after rewriting 10 times and the degree of modulation which vary according to the thickness of the absorptance control layer. The jitter is expressed in terms of an average (%) of the squares of jitter values of the front edge and rear edge. This applies to the following description, unless otherwise indicated.

The degree of modulation (Mod) was calculated from the equation below.

$$Mod(\%) = 100 \times (Ic - Ia)/Ic$$

where, Ic is the highest level of reflectance in the crystalline (erased) state at the time of recording EFM signals, and Ia is the lowest level of reflectance in the amorphous (recorded) state at the time of recording EFM signals.

| Thickness of absorptance control layer (nm) | Jitter after rewriting 10 times (%) | Degree of modulation (%) |
| --- | --- | --- |
| 2 | 25 | — |
| 5 | 20 | — |
| 10 | 15 | 53 |
| 20 | 13 | 51 |
| 40 | 13 | 47 |
| 50 | — | 43 |
| 60 | — | 40 |

It is noted from the table that as the absorptance control layer becomes thinner, the jitter after rewriting 10 times increases, and as the absorptance control layer becomes thicker, the degree of modulation increases. The reason why jitter increases as the absorptance control layer becomes thinner is the incomplete control of absorptance due to decrease in absorptance ratio (Ac/Aa), where Ac is the absorptance in the recording medium in the crystalline state and Aa is the absorptance in the recording medium in the amorphous state, which in turn leads to incomplete erasing. The absorptance ratio (Ac/Aa) was obtained by optical calculation because it cannot be actually measured. The thickness of the absorptance control layer should preferably be 5 to 50 nm, more preferably 10 to 40 nm.

The absorptance control layers 6 and 6' were prepared from different materials so that their optical constants were varied. The values of Ac/Aa were obtained by optical calculations for different values of n and k. First, the values of Ac/Aa were calculated, with k held constant at 1.5 and n varied. The results are shown below.

| n | Ac/Aa |
| --- | --- |
| 0.8 | 0.95 |
| 1.2 | 1.0 |
| 1.8 | 1.05 |
| 2.0 | 1.11 |
| 3.0 | 1.13 |
| 4.5 | 1.12 |
| 5.5 | 1.07 |
| 6.0 | 1.00 |
| 6.5 | 0.9 |

It is noted from the table above that the absorptance ratio (Ac/Aa) varies as the value of n of the absorptance control layer is changed. The results suggest that the value of n of the absorptance control layer should preferably be 1.2 to 6, more preferably 1.8 to 5.5.

The absorptance ratio (Ac/Aa) was obtained, with n kept constant at 3.0 and k varied. The results are shown in the table below.

| k | Ac/Aa |
| --- | --- |
| 0 | 0.97 |
| 0.1 | 0.98 |
| 0.3 | 1.01 |
| 0.5 | 1.05 |
| 0.8 | 1.10 |
| 1.0 | 1.11 |
| 1.5 | 1.13 |
| 1.8 | 1.11 |
| 2.0 | 1.08 |
| 3.0 | 1.01 |
| 4.0 | 0.95 |

It is noted from the table above that the absorptance ratio (Ac/Aa) varies as the value of k of the absorptance control layer is changed. The results suggest that the value of k of the absorptance control layer should preferably be 0.3 to 3.0, more preferably 0.5 to 2.

In this example, the absorptance control layers 6 and 6' were prepared from several kinds of Cr—($Cr_2O_3$) differing in composition, and they were examined for jitter ($\sigma$/Tw) after rewriting 10 times. The results are shown in the table below. The recording sensitivity is indicated by "+" or "−" or "0" depending on whether it becomes better or worse or remains unchanged as compared with the recording power sensitivity of the absorptance control layer prepared from $Cr_{60}(Cr_2O_3)_{40}$.

| Composition of absorptance control layer | Jitter (%) | Recording power sensitivity (%) |
| --- | --- | --- |
| ($Cr_2O_3$) | 21 | Unmeasured |
| $Cr_{10}(Cr_2O_3)_{90}$ | 18 | Unmeasured |
| $Cr_{15}(Cr_2O_3)_{85}$ | 15 | Unmeasured |
| $Cr_{22}(Cr_2O_3)_{78}$ | 13 | +10 |
| $Cr_{27}(Cr_2O_3)_{73}$ | 13 | +5 |
| $Cr_{30}(Cr_2O_3)_{70}$ | 13 | +5 |
| $Cr_{40}(Cr_2O_3)_{60}$ | 13 | 0 |
| $Cr_{43}(Cr_2O_3)_{57}$ | — | 0 |
| $Cr_{67}(Cr_2O_3)_{33}$ | — | −5 |

It is noted from the table above that jitter (after rewriting 10 times) is reduced if the amount of Cr is increased in the component of the absorptance control layer. A probable reason for this that the absorptance ratio (Ac/Aa) increases and the possibility of records remaining unerased becomes small. The results suggest that the amount of Cr in the total component for the absorptance control layer should preferably be more than mol %. If the absorptance control layer is prepared from Cr alone, it has a greater thermal conductivity than that prepared from $Cr_{40}(Cr_2O_3)_{60}$ and hence the resulting recording medium slightly decreases in recording sensitivity. Therefore, the amount of Cr should preferably be 22 to 43 mol %. The combination of a metal element and a dielectric gives good results (low noise and low content of impurity elements) if the metal element is the same one as that constitutes the dielectric, as in the case of the combination of Cr and $Cr_2O_3$. The ratio of Cr to $Cr_2O_3$ was calculated from the ratio of Cr to O which was determined by Rutherford backscattering spectrometry.

The same procedure as above was repeated except that the Cr—($Cr_2O_3$) used for the absorptance control layers 6 and 6' was replaced by those which contain, in place of Cr, any of Mo, W, Fe, Sb, Mn, Ti, Co, Ge, Pt, Ni, Nb, Pd, Be, and Ta. Of these materials, those containing Fe or W were desirable because of a higher melting point. Those containing Pd or Pt were also preferable because of their low reactivity with other layers and permit more frequent rewriting. Ni and Co contribute to the saving of production cost because they permit the use of inexpensive targets. Cr and Mo provide good corrosion resistance and gave good results in the life test. Ti also provides good corrosion resistance and gave good results. Additional elements that can be used include Tb, Gd, Sm, Cu, Au, Ag, Ca, Al, Zr, Ir, and Hf.

The same procedure as above was repeated except that the Cr—($Cr_2O_3$) used for the absorptance control layers 6 and 6' was replaced by those which contain, in place of $Cr_2O_3$, any of oxides, sulfides, selenides, fluorides, borides, and carbides, which are exemplified below.

Oxides: $SiO_2$, SiO, $Al_2O_3$, BeO, $Bi_2O_3$, CoO, CaO, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $MoO_3$, NbO, $NbO_2$, NiO, PbO, PdO, SnO, $SnO_2$, $Sc_2O_3$, SrO, $ThO_2$, $TiO_2$, $Ti_2O_3$, TiO, $Ta_2O_5$, $TeO_2$, VO, $V_2O_3$, $VO_2$, $WO_2$, $WO_3$, $Y_2O_3$, and $ZrO_2$.

Sulfides: ZnS, $Sb_2S_3$, CdS, $In_2S_3$, $Ga_2S_3$, GeS, $SnS_2$, PbS, $Bi_2S_3$, SrS, MgS, CrS, CeS, and $TaS_4$.

Selenides: $SnSe_2$, $Sb_2Se_3$, CdSe, ZnSe, $In_2Se_3$, $Ga_2Se_3$, GeSe, $GeSe_2$, SnSe, PbSe, and $Bi_2Se_3$.

Fluorides: $CeF_3$, $MgF_2$, $CaF_2$, $TiF_3$, $NiF_3$, $FeF_2$, and $FeF_3$.

Borides: Si, Ge, $TiB_2$, $B_4C$, B, CrB, $HfB_2$, $TiB_2$, and WB.

Carbides: C, $Cr_3C_2$, $Cr_{23}C_6$, $Cr_7O_3$, $Fe_3C$, $MO_2C$, WC, $W_2C$, HfC, TaC, and $CaC_2$.

Any material having a composition similar to the above-mentioned one may be used. The above-mentioned materials may be used in combination with one another. Other materials that can be used include In—Sb, Ga—As, In—P, Ga—Sb, and In—As.

Of these materials, such oxides as $SiO_2$, $Ta_2O_5$, and $Y_2O_3$—$ZrO_2$ contribute to the saving of production cost because they permit the use of inexpensive targets. In addition, they have low reactivity and contribute to the number of times of rewriting. BeO is desirable because of high melting point. $Al_2O_3$ helps retain the rewriting characteristics better than others because of high thermal conductivity, particularly in the case of a disk without reflective layer. $Cr_2O_3$ is desirable because of high melting point and high thermal conductivity.

Sulfides and selenides reduce time required for film forming because of their great sputtering rate. Carbides increase the hardness of the absorptance control layer and hence prevent the recording film from flowing at the time of frequent rewriting.

With a metal element and/or dielectric material having a melting point higher than that (about 600° C.) of the recording film, it is possible to suppress the increase in jitter which would otherwise occur after rewriting 10,000 times. In this case, the increase in jitter will be smaller than 3%.

If the amount of the impurity element in the absorptance control layer exceeds 2 atom %, the jitter of front edge or rear edge exceeds 15% after rewriting 10 times. If the amount of the impurity element exceeds 5 atom %, the jitter exceeds 18%. Therefore, the amount of the impurity element in the absorptance control layer should be less than 5 atom %, preferably less than 2 atom %, so as to avoid the deterioration of rewriting characteristics.

In this example, the absorptance control layers 6 and 6' were prepared from several kinds of Ta—N differing in composition in place of Cr—($Cr_2O_3$), and they were examined for jitter (σ/Tw) after rewriting 10 times. The absorptance control layer prepared from a nitride increases in bond strength and resistance to external shocks. The results are shown in the table below. The recording sensitivity is indicated by "+" or "−" or "0" depending on whether it becomes better or worse or remains unchanged as compared with the recording power sensitivity of the absorptance control layer prepared from $Ta_{56}N_{44}$.

| Composition of absorptance control layer | Jitter (%) | Recording power sensitivity (%) |
|---|---|---|
| $Ta_{37}N_{63}$ | 18 | Unmeasured |
| $Ta_{40}N_{60}$ | 17 | Unmeasured |
| $Ta_{45}N_{55}$ | 13 | +10 |
| $Ta_{50}N_{50}$ | 13 | +5 |
| $Ta_{56}N_{44}$ | Unmeasured | 0 |
| $Ta_{77}N_{23}$ | Unmeasured | −5 |
| Ta | Unmeasured | −5 |

It is noted from the table above that jitter (after rewriting 10 times) is reduced if the amount of T is increased in the component of the absorptance control layer. A probable reason for this that the absorptance ratio (Ac/Aa) increases and the possibility of records remaining unerased becomes small. The results suggest that the amount of Ta in the total component for the absorptance control layer should preferably be more than 37 atom %. If the absorptance control layer is prepared from Ta alone, it has a greater thermal conductivity than that prepared from Ta—N and hence the resulting recording medium slightly decreases in recording sensitivity. Therefore, the amount of Ta should preferably be 45 to 56 mol %. The film of Ta—N can be formed by sputtering which employs a TaN target and a mixed gas of Ar and $N_2$. It is possible to control the amount of N in the Ta—N film by adjusting the ratio of $N_2$ and the sputtering power. Sputtering with a TaN target may be replaced by sputtering with a Ta target in a mixed gas of Ar and $N_2$.

The above-mentioned Ta—N may be replaced by other nitrides such as AlN, BN, CrN, $Cr_2N$, GeN, HfN, $Si_3N_4$, Al—Si—N (such as $AlSiN_2$), Si—N, Si—O—N, TiN, and ZrN without any change in characteristics. If any of these nitrides is incorporated with less than 50 mol % of ZnS, the resulting material increase in adhesive strength.

[Measurement of optical constants of absorptance control layer]

The disk in this example was separated into two parts at the boundary between the intermediate layer and absorptance control layer, and the absorptance control layer was examined for reflectance at a wavelength for recording and reproducing. The separated part consists of the adhesive layer 8, the reflective layer (85 nm thick) of $Al_{98}Ti_2$, and the absorptance control layer (30 nm thick) of $Cr_{27}(Cr_2O_3)_{73}$.

The specimen underwent reverse sputtering (etching with Ar gas) in a sputtering apparatus, so that the film of Cr—$Cr_2O_3$ was made thin. The thinned specimen was measured for reflectivity. The thickness of the etched film was calculated from the step between the etched part and the masked and unetched part. The step was measured by using a step meter, with the mask removed. This procedure was repeated twice. The thickness and reflectivity of the absorptance control layer were as follows.

| Thickness of absorptance control layer (nm) | Reflectivity (%) |
|---|---|
| 18 | 27 |
| 10 | 49 |
| 0 | 75 |

The disk was also separated into two parts in such a way that the reflective layer is exposed. The reflective layer was measured for n and k by ellipsometry (with variable wavelength).

It was found that the value of n is 2.8 and the value of k is 0.8.

[Protective layer]

In this example, the protective layer 2 was formed from ZnS $)_{80}(SiO_2)_{20}$.

The $(ZnS)_{80}(SiO_2)_{20}$ for the protective layer 2 may be replaced by a material composed of ZnS and $SiO_2$ in varied ratios. It may also be replaced by Si—N and Si—O—N materials, or any of oxides, nitrides, sulfides, selenides, and fluorides, which are exemplified below.

Oxides: $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, and MgO.

Nitrides: TaN, AlN, BN, $Si_3N_4$, GeN, and Al—Si—N (such as $AlSiN_2$).

Sulfides: ZnS, $Sb_2S_3$, CdS, $In_2S_3$, $Ga_2S_3$, GeS, $SnS_2$, PbS, and $Bi_2S_3$.

Selenides: $SnSe_2$, $Sb_2Se_3$, CdSe, ZnSe, $In_2Se_3$, $Ga_2Se_3$, GeSe, $GeSe_2$, SnSe, PbSe, and $Bi_2Se_3$.

Fluorides: $CeF_3$, $MgF_2$, and $CaF_2$.

Additional materials, such as Si, Ge, $TiB_2$, $B_4C$, B, and C, may also be used. Any material having a composition similar to the above-mentioned one may also be used. The above-mentioned materials may be used in combination with one another, for example, in the form of ZnS—$SiO_2$ and ZnS—$Al_2O_3$, as a single layer or multiple layers. Of these materials, ZnS is desirable because of its high refractive index (n) and its ability to give a large degree of modulation. A mixture of oxide and ZnS (more than 60 mol %) offers a combination of advantages of the high refractive index (n) of ZnS and the good chemical stability of oxide. ZnS has a greater sputter rate and shortens the time for film forming if its content exceeds 80 mol %. Other sulfides and selenides produce similar characteristics.

These compounds should have a specific ratio of elements. For example, in the case of oxides, the ratio of metal element to oxygen should be 2:3 (for $Al_2O_3$, $Y_2O_3$, and $La_2O_3$), 1:2 (for $SiO_2$, $ZrO_2$, and $GeO_2$), and 2:5 (for $Ta_2O_5$), exactly or approximately. In the case of sulfides, the ratio of metal element to sulfur should be 1:1 (for ZnS), exactly or approximately. Deviation from the above-mentioned ratio should be less than ±10 atom %. For example, in the case of Al—O, the ratio of Al to O should not deviate more than ±10 atom % of Al from the ratio of $Al_2O_3$. In the case of Si—O, the ratio of Si to O should not deviate more than ±10 atom % of Si from the ratio of $SiO_2$. Deviation more than 10 atom % changes optical characteristics and hence lowers the degree of modulation by more than 10%.

The material (or the substitute for it) constituting the protective layer 2 should account for more than 90% of the total number of atoms constituting the protective layer. If the amount of the impurity other than mentioned above exceeds 10 atom %, the number of times of rewriting decreases by more than half and the rewriting characteristics become poor.

The table below shows the jitter ($\sigma/Tw$) after rewriting 10 times and the degree of modulation which vary according to the thickness of the protective layer. The degree of modulation (Mod) was calculated from the equation below.

$$Mod(\%) = 100 \times (Ic - Ia)/Ic$$

where, Ic is the level of reflectance in the crystalline (erased) state at the time of recording EFM signals, and Ia is the level of reflectance in the amorphous (recorded) state at the time of recording EFM signals.

| Thickness of protective layer (nm) | Degree of modulation (%) | Jitter (%) |
|---|---|---|
| 40 | 41 | — |
| 60 | 44 | — |
| 70 | 48 | 15 |
| 90 | 51 | 14 |
| 120 | 50 | 15 |
| 140 | — | 18 |
| 160 | — | 22 |

It is noted from the table that the thickness of the protective layer (or the total thickness of the constituent films) should be 60–140 nm, preferably 70–120 nm, so that the degree of modulation is greater than 43%.

A disk with two or more protective layers was prepared. It was found that if the protective layer adjacent to the recording film is made of $Cr_2O_3$, crystallization proceeds faster. 3T signals were recorded 10 times and the recorded signals were erased by DC light. The erase ratio was check. It was found that the erase ratio was good (higher than 25 dB) even at a linear velocity of 16 m/s, which is about twice as high as that for the ZnS—$SiO_2$ layer.

The $Cr_2O_3$ for the protective layer (adjacent to the recording film) may be replaced by CoO, $GeO_2$, or NiO, or a mixture thereof with $Cr_2O_3$. Another substitute is a mixture of $Cr_2O_3$ with any of $SiO_2$, $Ta_2O_5$, $Al_2O_3$, $ZrO_2$—$Y_2O_3$. It is good in crystallization properties. These oxides have a small attenuation factor (k) and are very low in absorption in the lower interface layer. This leads to a high degree of modulation, which is advantageous.

Nitrides (such as AlN, BN, CrN, $Cr_2N$, GeN, HfN, $Si_3N_4$, Al—Si—N (e.g., $AlSiN_4$), Si—N, Si—O—N, TaN, TiN, and ZrN) give high adhesion strength, making the information recording medium more resistant to external shocks. The composition for recording film has improved adhesion strength when it contains nitrogen.

In addition, oxides and carbides exemplified below or similar materials or mixtures thereof may also be used. Oxides: BeO, $Bi_2O_3$, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $MoO_3$, NbO, $NbO_2$, PbO, PdO, SnO, $SnO_2$, $Sc_2O_3$, SrO, $ThO_2$, $TiO_2$, $Ti_2O_3$, TiO, $TeO_2$, VO, $V_2O_3$, $VO_2$, $WO_2$, and $WO_3$. Carbides: C, $Cr_3C_2$, $Cr_{23}C_6$, $Cr_7O_3$, $Fe_3C$, $Mo_2C$, WC, $W_2C$, HfC, TaC, and $CaC_2$.

The protective film formed adjacent to the recording film prevents the diffusion of Zn or S into the recording film, thereby suppressing the possibility of signals remaining unerased. The thickness of the protective film should preferably be 25 nm or less, so that the recording sensitivity is maintained. The protective film is uniform when its thickness is about 2 nm or above, preferably about 5 nm or above. Therefore, the protective film adjacent to the recording film should have a thickness of 2 to 25 nm, so that it contributes to good recording and reproducing characteristics.

[Intermediate layer]

In this example, the intermediate layer is formed from ZnS—$SiO_2$. The ZnS—$SiO_2$ for the intermediate layer 5 may be replaced by any of Si—N and Si—O—N materials, or any of oxides, nitrides, sulfides, selenides, and fluorides, which are exemplified below.

Oxides: $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, and MgO.

Nitrides: TaN, AlN, BN, $Si_3N_4$, GeN, and Al—Si—N (such as $AlSiN_2$).

Sulfides: ZnS, $Sb_2S_3$, CdS, $In_2S_3$, $Ga_2S_3$, GeS, $SnS_2$, PbS, and $Bi_2S_3$.
Selenides: $SnSe_2$, $Sb_2Se_3$, CdSe, ZnSe, $In_2Se_3$, $Ga_2Se_3$, GeSe, $GeSe_2$, SnSe, PbSe, and $Bi_2Se_3$.
Fluorides: $CeF_3$, $MgF_2$, and $CaF_2$.
Additional materials, such as Si, Ge, $TiB_2$, $B_4C$, B, and C, may also be used. Any material having a composition similar to the above-mentioned one may also be used. The above-mentioned materials may be used in combination with one another, for example, in the form of ZnS—$SiO_2$ and ZnS—$Al_2O_3$, as a single layer or multiple layers. Of these materials, ZnS is desirable because of its high refractive index (n) and its ability to give a large degree of modulation. A mixture of oxide and ZnS (more than 60 mol %) offers a combination of advantages of the high refractive index (n) of ZnS and the good chemical stability of oxide. ZnS has a greater sputter rate and shortens the time for film forming if its content exceeds 80 mol %. Other sulfides and selenides produce similar characteristics.

These compounds should have a specific ratio of elements. For example, in the case of oxides, the ratio of metal element to oxygen should be 2:3 (for $Al_2O_3$, $Y_2O_3$, and $La_2O_3$), 1:2 (for $SiO_2$, $ZrO_2$, and $GeO_2$), and 2:5 (for $Ta_2O_5$), exactly or approximately. In the case of sulfides, the ratio of metal element to sulfur should be 1:1 (for ZnS), exactly or approximately. Deviation from the above-mentioned ratio should be less than ±10 atom %. For example, in the case of Al—O, the ratio of Al to O should not deviate more than ±10 atom % of Al from the ratio of $Al_2O_3$. In the case of Si—O, the ratio of Si to O should not deviate more than ±10 atom % of Si from the ratio of $SiO_2$. Deviation more than 10 atom % changes optical characteristics and hence lowers the degree of modulation by more than 10%.

The material (or the substitute for it) constituting the intermediate layer 5 should account for more than 90% of the total number of atoms constituting the intermediate layer. If the amount of the impurity other than mentioned above exceeds 10 atom %, the number of times of rewriting decreases by more than half and the rewriting characteristics become poor.

[Reflective layer]

In this example, the reflective layer 7 is formed from Al—Ti. The Al—Ti may be replaced by any Al alloy such as Al—Ag, Al—Cu, and Al—Cr. Al can also be used.

Thus, the content of elements other than Al contained in Al alloy should be 0.5 to 4 atom %, preferably 1 to 2 atom %, so that the resulting information recording medium has good characteristic properties and a low bit error rate at the time of frequent rewriting. The same results were obtained with any other Al alloys than mentioned above.

The reflective layer may also be made of any metal, such as Au, Ag, Cu, Ni, Fe, Co, Cr, Ti, Pd, Pt, W, Ta, Mo, Sb, Bi, Dy, Cd, Mn, Mg, and V, in the form of simple substance, or any alloy, such as Au alloy, Ag alloy, Cu alloy, Pd alloy, and Pt alloy. Alternatively, it may be composed of layers of these alloys. Thus, the reflective layer is made of metal element, semimetal element, or alloy thereof, or a mixture thereof.

Of these materials, Cu, Al, Au, Cu alloy, Al alloy, and Au alloy are desirable because they have a high thermal conductivity and hence permit the disk to cool rapidly. This is advantageous for rewriting characteristics. Ag and Ag alloy produce the similar effect. As in the case of aluminum alloy, the content of elements other than Cu, Au, and Ag (as major constituents) should be 0.5 to 4 atom %, preferably 1 to 2 atom %, so that the resulting information recording medium has good characteristic properties and a low bit error rate at the time of frequent rewriting.

The material constituting the reflective layer should account for more than 95% of the total number of atoms constituting the reflective layer. If the amount of the impurity other than mentioned above exceeds 5 atom %, the number of times of rewriting decreases by more than half and the rewriting characteristics become poor.

With a thickness smaller than 30 nm, the reflective layer is poor in strength and thermal diffusion and hence readily causes the recording film to flow. This results in a jitter of 15% or more after rewriting 100,000 times. With a thickness of 40 nm, the reflective layer reduces jitter to 15%. Reflective layers thicker than 200 nm take a longer time for their production, requiring more than one step and more than one vacuum chamber for sputtering. Reflective layers thinner than 5 nm are difficult to make uniformly.

Therefore, the thickness of the reflective layer should preferably be 5 to 200 nm.

[Substrate]

In this example, the substrate 1 is a polycarbonate substrate having tracking grooves formed directly in the surface thereof. This substrate may be replaced by a chemically reinforced glass substrate whose surface is coated with a layer of polyolefin resin, epoxy resin, acrylic resin, or UV light curing resin.

The substrate having tracking grooves is one which has, on its entire surface or on part of its surface, grooves whose depth is greater than $\lambda/10n'$ (where $\lambda$ is the recording/reproducing wavelength and n' is a refractive index of the substrate material). Each groove may be formed continuously or intermittently in one round. When the groove depth is smaller than about $\lambda/6n'$, the level of crosstalk is low. When the groove depth is smaller than about $\lambda/3n'$, the level of crosserase is low, although the yields of substrates are somewhat poor.

The groove may vary in width from one place to another. The substrate may have no grooves (such as the one with sample servo format) or may have other tracking systems or other formats. The substrate may have a format which permits recording and reproducing at both the groove and the land. The substrate may also have a format which permits recording at either the groove or the land. The disk size is not limited to 12 cm; it may be 13 cm, 8 cm, 3.5 inch, or 2.5 inch. The disk thickness is not limited to 0.6 mm; it may be 1.2 mm or 0.8 mm.

In this example, two identical disks are made in the same way and they are bonded together with an adhesive, with their reflective layers 7 and 7' facing each other. The second disk may be replaced by another disk of different construction or a protective substrate. If the second disk or protective substrate has a high transmission in the region of UV light wavelength, then it can be bonded with a UV light curing resin. Any other method of bonding may be employed. In the case of a disk without the reflective layer 7, an adhesive may be applied to the uppermost layer.

In this example, two disks are prepared and they are bonded together with an adhesive 8, with their reflective layers 7 and 7' facing each other. If the reflective layers 7 and 7' of the two disks are coated with a UV light curing resin (about 10 μm thick) and the two disks are bonded together after curing, the resulting product will have a low error rate.

In this example, two disks are prepared and they are bonded together with an adhesive 8, with their reflective layers 7 and 7' facing each other. However, instead of bonding, the reflective layer 7 of the first disk may be coated with a UV light curing resin (about 10 μm thick or above).

In the case of a disk without the reflective layer 7, a UV curing resin may be applied to the uppermost layer.

[Thicknesses and materials of individual layers]

So long as the thickness and material are separately selected within the specified ranges for the individual layers, good recording and reproducing characteristics are obtained. If their desirable ranges are adequately combined, better results will be obtained.

EXAMPLE 2

[Structure and production]

Figure 6:
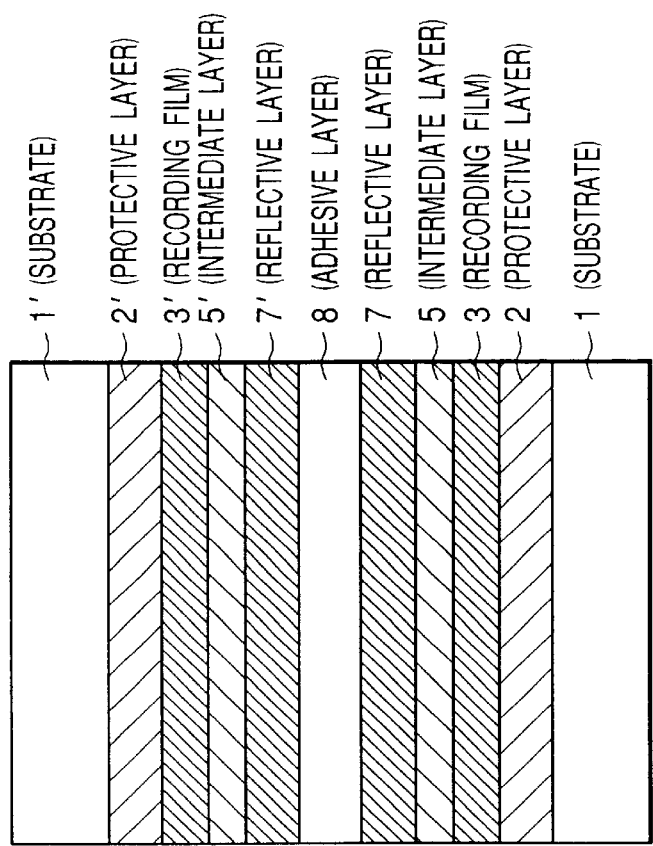
FIG. 6 is a sectional view showing the structure of the information recording medium in Example 2 of the present invention.

A disk-like information recording medium without absorptance control layer was prepared. FIG. 6 shows in section the structure of the disk-like information recording medium in Example 2 of the present invention. This recording medium was produced as follows.

A polycarbonate substrate 1 was made ready which is 12 cm in diameter and 0.6 mm in thickness and has tracking grooves in its surface. On the substrate the following layers or films were formed in order by means of a magnetron sputtering apparatus.

A protective layer 2 which is composed of an approximately 85-nm thick film of $(ZnS)_{80}(SiO_2)_{20}$ and an approximately 10-nm thick film of $Cr_2O_3$.

An approximately 10-nm thick recording film 3 of $Ag_{3.5}Ge_{21}Sb_{22}Te_{53.5}$.

An approximately 10-nm thick interface layer 4 of $(ZnS)_{30}(TaN)_{70}$.

An approximately 30-nm thick intermediate layer 5 of $(ZnS)_{80}(SiO_2)_{20}$.

An approximately 85-nm thick reflective layer 7 of $Al_{98}Ti_2$. In this way there was obtained a first disk.

The same procedure as above was repeated to give a second disk which has the same structure as the first disk. The first and second disks were bonded together with an adhesive 8, with the reflective layers 7 and 7' facing each other. In this way there was obtained a disk-like information recording medium, as shown in FIG. 6.

[Structure and production of conventional information recording medium]

Figure 7:
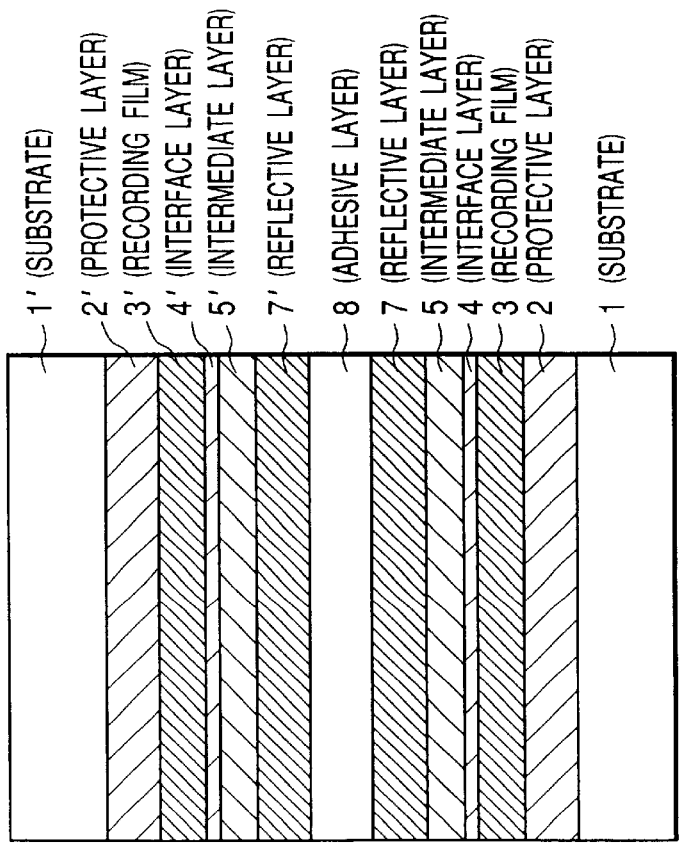
FIG. 7 is a sectional view showing the structure of the conventional information recording medium corresponding to that in Example 2 of the present invention.
Figure 8:
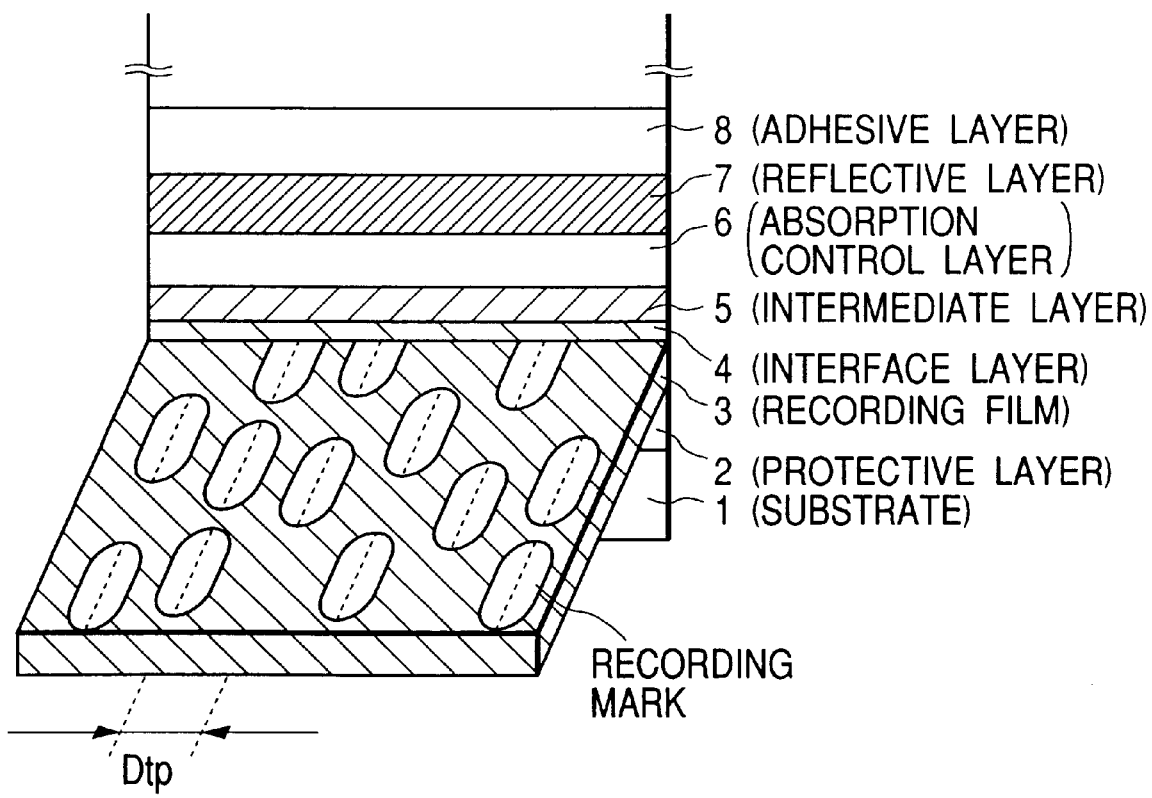
FIG. 8 is a diagram showing the track pitch mentioned in Example 3 of the present invention.

The effect of the interface layer was evaluated by comparing the disk-like information recording medium obtained as above with the conventional disk-like information recording medium without interface layer which was prepared as follows. FIG. 7 shows the sectional structure of the conventional information recording medium.

A polycarbonate substrate 1 was made ready which is 12 cm in diameter and 0.6 mm in thickness and has tracking grooves in its surface. On the substrate 1 were formed sequentially the following layers or films by means of a magnetron sputtering apparatus.

A protective layer 2 which is composed of an approximately 85-nm thick film of $(ZnS)_{80}(SiO_2)_{20}$ and an approximately 10-nm thick film of $Cr_2O_3$.

An approximately 10-nm thick recording film 3 of $Ag_{3.5}Ge_{21}Sb_{22}Te_{53.5}$.

An approximately 40-nm thick intermediate layer 5 of $(ZnS)_{80}(SiO_2)_{20}$.

An approximately 85-nm thick reflective layer 7 of $Al_{98}Ti_2$. The conventional information recording medium has the intermediate layer which is made thicker to compensate for the absence of the interface layer, so that it has the same reflectivity (in the crystalline state) as the information recording medium pertaining to the present invention. In this way there was obtained a first disk.

A second disk of the same structure as the first disk was prepared in the same way as above. The thus obtained two disks were bonded together with an adhesive 8, with the reflective layers 7 and 7' facing each other, to give the disk-like information recording medium as shown in FIG. 7.

[Recording and reproducing characteristics]

Evaluation of initial crystallization and recording, erasing, and reproducing characteristics was carried out in the same way as in Example 1.

The information recording medium in this example, which has no absorptance control layer, has a higher jitter (by about 4%) as compared with the information recording medium in Example 1 at the time of rewriting after repeated recording and erasing. This result suggests that the absence of absorptance control layer increases jitter at the time of rewriting. A probable reason for increase in jitter is that the absorptance ratio (Ac/Aa) is as small as about 0.9 and hence the absorptance control is insufficient and records remain unerased. The disk C (shown in FIG. 6) in this example, which has the interface layer, was compared with the conventional disk D (shown in FIG. 7), which has no interface layer, in reproduction archival life (A—R) and overwrite archival life (A—OW). The archival life measured by accelerated test, with the temperature kept constant at 90° C. The results are shown below.

|  | Disk C | | Disk D | |
| --- | --- | --- | --- | --- |
| Accelerated test Time (h) | A-R Jitter (%) | A-OW jitter (%) | A-R jitter(%) | A-OW jitter(%) |
| 0 | 17 | 17 | 17 | 17 |
| 10 | 17 | 17 | 17 | 18 |
| 30 | 17 | 17 | 18 | 19 |
| 50 | 17 | 17 | 19 | 20 |
| 80 | 17 | 17 | 19 | 23 |
| 100 | 17 | 17 | 20 | 27 |
| 150 | 17 | 17 | 22 | 39 |
| 200 | 18 | 17 | 26 | — |
| 300 | 19 | 18 | 28 | — |

It is noted that the interface layer prevents the increase jitter and greatly improve the archival life in the of ironment for accelerated test.

Those items not mentioned in this example are the same as mentioned in Example 1.

EXAMPLE 3

[Structure and production]

Figure 12A:
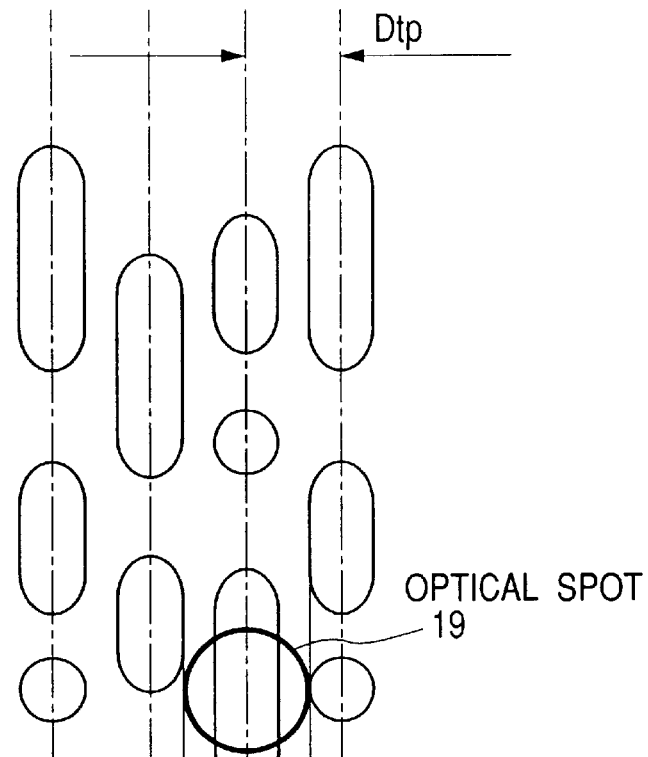
FIG. 12 is an enlarged view showing the vicinity of the laser head of the recording/reproducing apparatus for the information recording medium of the present invention.
Figure 12B:
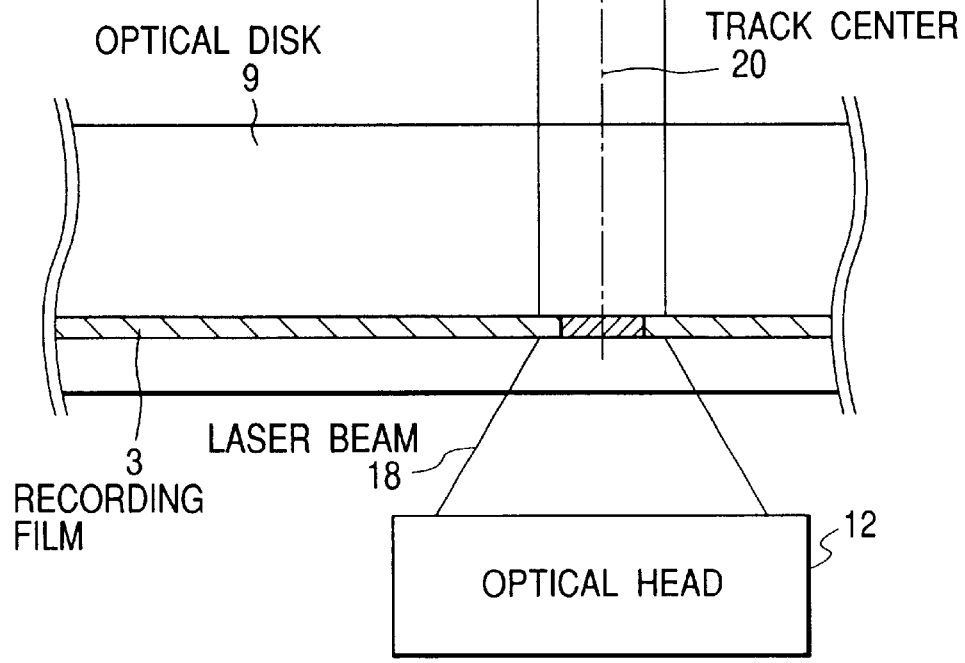

An information recording medium specified below was prepared in the same way as in Example 1 and 2, except for the substrate. The substrates in this example vary in the track pitch of groove from 0.50 μm to 0.70 μm, in increment of 0.01 μm. The track pitch $D_{tp}$ means an average of the land width and the groove width. Also, the track pitch $D_{tp}$ is identical with the distance (in the radial direction) between the center of a recording track and the center of its adjacent recording track. For information recording and reproducing, tracking is carried out such that the center of the spot of the laser beam focused on the information recording medium passes through the center of the recording track, as shown in FIG. 12(a) (plan view) and FIG. 12(b) (sectional view).

Figure 5A:
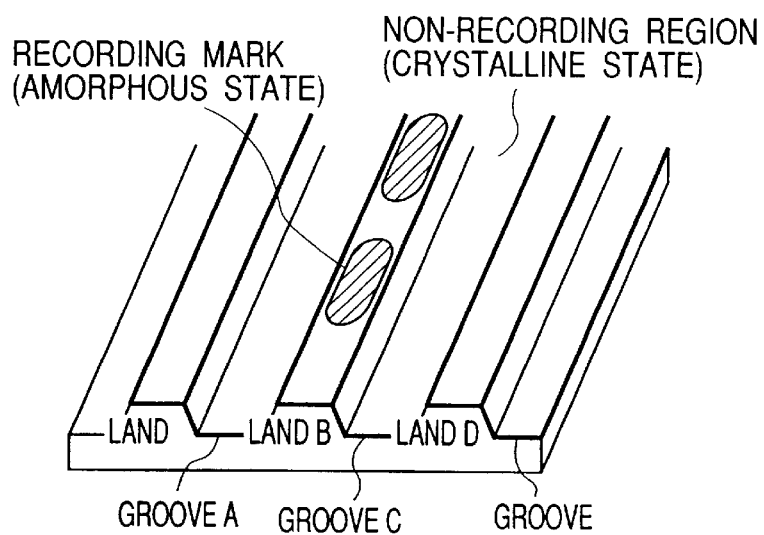
FIG. 5 is a diagram showing the procedure to measure the crosserase mentioned in Example 1 of the present invention.
Figure 5B:
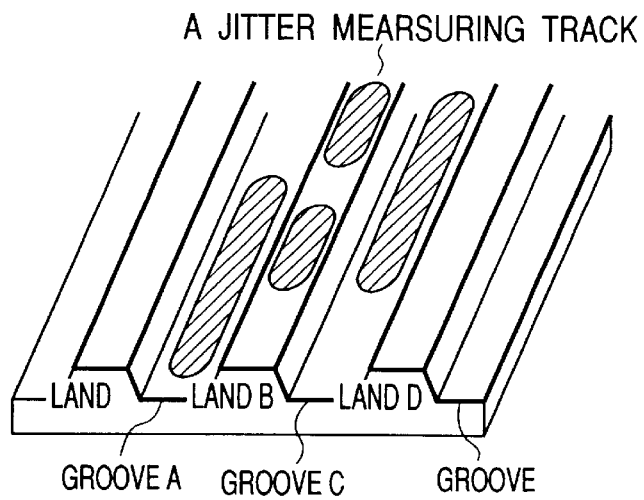
Figure 5C:
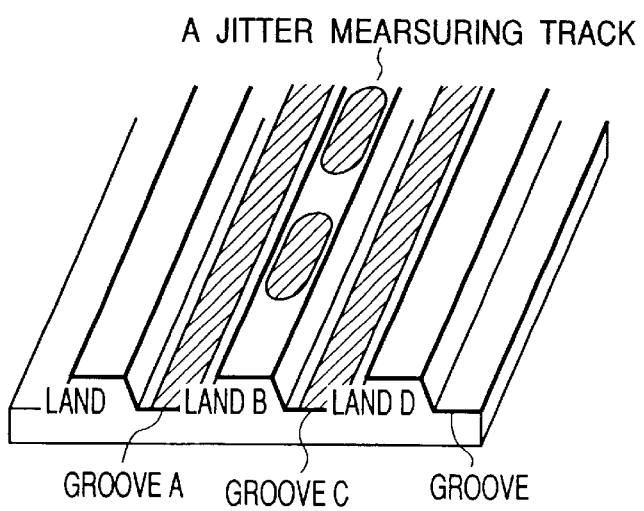

The disk A' of the same structure as shown in FIG. 1, except for the substrate, which has the absorptance control layer, was compared in crosserase with the disk C' of the same structure as shown in FIG. 6, except for the substrate, which has no absorptance control layer. Crosserase was measured according to the procedure shown in FIG. 5. 3T signals are recorded in track B, with tracks A and C at both sides thereof left blank, as shown in FIG. 5(a). The jitter of the 3T signals is measured. Then, 11T signals are recorded in tracks A and C, as shown in FIG. 5(b). The signals in tracks A and D are erased with the aid of DC light, as shown in FIG. 5(c). The jitter of the signals recorded in track B is measured. The same procedure as above is repeated, with the land and the groove interchanged each other. Two measurements are averaged. In this way the increase in jitter due to crosserase was measured. Measurements at each track pitch are shown below.

| Track pitch (μm) | Increase in jitter of disk A' with absorptance control layer (%) | Increase in jitter of disk C' without absorptance control layer (%) |
|---|---|---|
| 0.51 | 6 | unmeasured |
| 0.52 | 4 | unmeasured |
| 0.53 | 2 | unmeasured |
| 0.54 | 1 | unmeasured |
| 0.55 | 0 | unmeasured |
| 0.56 | 0 | unmeasured |
| 0.59 | 0 | unmeasured |
| 0.62 | 0 | 7 |
| 0.63 | 0 | 4 |
| 0.64 | 0 | 2 |
| 0.65 | 0 | 1 |
| 0.66 | 0 | 0 |
| 0.67 | 0 | 0 |

It is noted that the absorptance control layer prevents jitter from increasing due to crosserase. This means that the absorptance (Ac) of the recording film is greater than the absorptance (Aa) of the recording film and hence the absorption in the recorded part (amorphous) is smaller than the absorption in the erased part (crystalline). This results from the fact that the mark recorded in track B does not absorb heat readily if recording is made in its adjacent tracks A and C, and hence the recorded part is not readily erased. Therefore, the increase in jitter due to crosserase is small even through the track pitch is narrowed down to 0.55 μm. With a track pitch greater than 0.66 μm, there is no increase in jitter due to crosserase even though no absorptance control layer is provided.

The above-mentioned measurements were carried out with a laser emitter with a wavelength of 660 nm and a numerical aperture (NA) of 0.6. With a wavelength of 635 nm, there is only a small increase in jitter due to crosserase even though the track pitch is narrowed to 0.53 μm. With a wavelength greater than 0.64 μm, there is no increase in jitter due to crosserase even though no absorptance control layer is provided. The foregoing suggests that the absorptance control layer produces its effect when the track pitch $D_{tp}$ is in the range shown below.

$$0.5\lambda/NA \leq D_{tp} \leq 0.6\lambda/NA$$

where λ is the wavelength of laser for recording and NA is the numerical aperture of the lens.

Disk A with the absorptance control layer and conventional disk B in Example 2 which has no absorptance control layer were examined for dependence on mark length. It was found that the absorptance control layer produces its effect when the minimum mark length is 0.39 to 0.45 μm.

Dependence on recording and reproducing wavelength was examined. It was found that the wavelength from 600 to 660 nm leads to a high degree of modulation and good rewriting characteristics. The wavelength shorter than 600 nm may be used for the recording medium of the present invention if adequate film thickness correction is made according to the wavelength ratio.

Those items not mentioned in this example are the same as mentioned in Examples 1 and 2.

EXAMPLE 4

The same procedure as in Example 1 was repeated except that the composition of the recording film 4 and 4' was changed as follows. Thus there were obtained the information recording media which vary in the composition of the recording film as shown below. They underwent initial crystallization and recording-erasing-reproducing in the same way as in Example 1.

[Composition of recording film]

In this example, the composition of the recording film 4 and 4' was changed along the line connecting GeTe and $Sb_2Te_3$ in a triangular coordinate. After rewriting 100,000 times, jitter (σ/Tw) was measured. The results are shown below.

| Amount of Ge (x-w) | Jitter of front edge (%) | Jitter of rear edge (%) |
|---|---|---|
| 10 | 17 | — |
| 15 | 15 | — |
| 18 | 13 | 13 |
| 21 | 13 | 13 |
| 28 | 13 | 13 |
| 36 | — | 15 |
| 38 | — | 19 |

It is noted that as the amount of Ge increases, jitter of front edge decreases and jitter of rear edge increases. Therefore, the amount of Ge for allowable jitter is 15 to 36 atom %, preferably 18 to 28 atom %.

The composition of the recording film was changed as follows. (The amount of Ge and Sb was varied while the amount of Te wad held constant.) After rewriting 10 times, jitter (σ/Tw) was measured. The results are shown below.

| Composition of recording film | Jitter of front edge (%) | Jitter of rear edge (%) |
|---|---|---|
| $Ag_{3.5}Ge_{36}Sb_7Te_{53.5}$ | — | 19 |
| $Ag_{3.5}Ge_{33}Sb_{10}Te_{53.5}$ | — | 15 |
| $Ag_{3.5}Ge_{28}Sb_{15}Te_{53.5}$ | 13 | 13 |
| $Ag_{3.5}Ge_{21}Sb_{22}Te_{53.5}$ | 13 | 13 |
| $Ag_{3.5}Ge_{17}Sb_{26}Te_{53.5}$ | 13 | 13 |
| $Ag_{3.5}Ge_{14}Sb_{29}Te_{53.5}$ | 15 | — |
| $Ag_{3.5}Ge_8Sb_{35}Te_{53.5}$ | 18 | — |

It is noted that as the amount of Sb increases, jitter of front edge increases and jitter of rear edge decreases. Therefore, the amount of Sb for allowable jitter is 10 to 29 atom %, preferably 15 to 26 atom %.

The composition of the recording film was changed as follows. (The amount of Te and Ge was varied while the amount of Sb was held constant.) After rewriting 10 times, jitter (σ/Tw) was measured. The results are shown below.

| Composition of recording film | Jitter of rear edge (%) |
|---|---|
| $Ag_3Ge_{13}Sb_{22}Te_{62}$ | 20 |
| $Ag_3Ge_{15}Sb_{22}Te_{60}$ | 15 |
| $Ag_3Ge_{17}Sb_{22}Te_{58}$ | 13 |
| $Ag_{3.5}Ge_{21}Sb_{22}Te_{53.5}$ | 13 |
| $Ag_{3.5}Ge_{22.5}Sb_{22}Te_{52}$ | 13 |

-continued

| Composition of recording film | Jitter of rear edge (%) |
|---|---|
| $Ag_4Ge_{24}Sb_{22}Te_{50}$ | 15 |
| $Ag_4Ge_{26}Sb_{22}Te_{48}$ | 18 |

It is noted that as the amount of Te increases or decreases, jitter of rear edge increases. Therefore, the amount of Te for allowable jitter is 50 to 60 atom %, preferably 52 to 58 atom %.

The recording film was prepared from Ag—Ge—Sb—Te. It was examined for jitter of front edge after repeated rewriting. It was found that the recording film of Ag—Ge—Sb—Te requires twice more frequencies of rewriting than the recording film of Ge—Sb—Te before jitter of front edge increases by 5%. The composition of the recording film was changed as follows. (The amount of Ge and Ag was varied while the amount of Sb and Te wad held constant.) After rewriting 5 times, jitter (σ/Tw) was measured. The results are shown below. The number of times of rewriting required for jitter to increase by 5% and more was counted.

| Composition of recording film | Jitter (%) | Number of times of rewriting |
|---|---|---|
| $Ge_{24.5}Sb_{22}Te_{53.5}$ | 13 | 1 time |
| $Ag_2Ge_{22.5}Sb_{22}Te_{53.5}$ | 13 | 1.5 times |
| $Ag_{3.5}Ge_{21}Sb_{22}Te_{53.5}$ | 13 | 2 times |
| $Ag_6Ge_{18.5}Sb_{22}Te_{53.5}$ | 13 | 2 times |
| $Ag_{10}Ge_{14.5}Sb_{22}Te_{53.5}$ | 15 | — |
| $Ag_{15}Ge_{9.5}Sb_{22}Te_{53.5}$ | 18 | — |

It is noted that a small amount of Ag added increase the number of times of rewriting. However, as the amount of Ag increases, jitter also increases. Therefore, the amount of Ag for allowable jitter is less than 10 atom %, preferably less than 6 atom %.

The foregoing suggests that the composition of the recording film should satisfy the following conditions when it is represented by the formula $Ge_{x-w}Sb_yTe_zM_w$ (x+Y+z=1). $0.15 \leq x \leq 0.46$, $0.10 \leq y \leq 0.29$, $0.50 \leq z \leq 0.60$, and $0 \leq w \leq 0.10$. For better characteristic properties, $0.18 \leq x \leq 0.34$, $0.15 \leq y \leq 0.26$, $0.52 \leq z \leq 0.58$, and $0 \leq w \leq 0.06$.

The Ag added to the recording film may be replaced by at least any one of Na, Mg, Al, P, S, Cl, Li, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Cr, W, Mo, Pt, Co, Ni, Pd, Si, Au, Cu, V, Mn, Fe, Ti, and Bi, without increase in jitter after a number of times of rewriting.

Of these elements, Ag is particularly effective in improving recording sensitivity (10% over Ge—Sb—Te). At least any one of Cr, W, and Mo increases the number of times of rewriting for jitter to increase by more than 5% (more than 3 times compared with Ge—Sb—Te). At least any of Pt, Co, and Pd increases the crystallization temperature (by 50° C. or above compared with Ge—Sb—Te).

It was found that if the amount of impurity elements in the recording film exceeds 2 atom %, the jitter of front edge or rear edge after rewriting 10 times exceeds 15%. In addition, if the amount of impurity elements exceeds 5 atom %, the jitter exceeds 18%. Therefore, the amount of impurity elements in the recording film should be less than 5 atom %, preferably less than 2 atom %, so that deterioration of characteristics due to rewriting is minimized.

In this example, the recording film 4 an 4' was prepared in varied thicknesses. Jitter (σ/Tw) was measured after rewriting 10 times and 100,000 times. The results are shown below. Data of jitter after rewriting 10 times represent jitter of front edge or jitter of rear edge, whichever larger. Data of jitter after rewriting 100,000 times represent jitter of front edge.

| Thickness of recording film | Jitter after rewriting 10 times | Jitter after rewriting 100,000 times |
|---|---|---|
| 4 | 23 | — |
| 6 | 18 | — |
| 7 | 15 | 15 |
| 10 | 14 | 14 |
| 20 | 15 | 15 |
| 25 | — | 20 |
| 35 | — | 25 |

It is noted that as the recording film becomes thinner, jitter after rewriting 10 times increases due to flow of recording film and segregation. As the recording film becomes thicker, jitter after rewriting 100,000 times increases. Therefore, the thickness of the recording film should be 6 to 25 nm, preferably 7 to 20 nm.

The recording film improves in adhesion properties and other characteristic properties, if the interface between it and its adjacent layer contains nitrogen. This is accomplished by introducing nitrogen into the sputtering gas at the initial or last stage of the film forming process or by using a target containing a small amount of nitrogen. (The first method may extend time required to form the recording film.)
[Composition of interface layer and recording film]

The same procedure as in Example 1 was repeated to prepared the information recording media, except that the composition of the recording film 4 and 4' and the interface layer 5 and 5' was changed as follows. They underwent initial crystallization and recording-erasing-reproducing in the same way as in Example 1.

These information recording media were examined for archival life by accelerated test. The archival life is related with the amount of Ge (x-w) and the amount of Ag (w) in the recording film and the amount of nitrogen (s) in the interface layer. Time (measured by accelerated test) required for jitter of A—R and A—OW to increase to 2% is also shown.

| x + w − 21 | s/5 | A–R (h) | A–OW (h) |
|---|---|---|---|
| 2 | 4 | 100 | 300 |
| 4 | 4 | 300 | 300 |
| 6 | 4 | 300 | 150 |
| 5 | 7 | 200 | 300 |
| 6 | 7 | 300 | 300 up |
| 7 | 7 | 300 up | 300 up |
| 8 | 7 | 300 up | 300 |
| 9 | 7 | 300 | 150 |
| 8 | 10 | 200 | 300 |
| 10 | 10 | 300 | 300 |
| 12 | 10 | 300 | 100 |

It is noted that the archival life is longer than 100 hours if the composition of the recording film and interface layer satisfies the following conditions.

$x+w-23 \leq s/5 \leq x+w-19$ and $22 \leq x+w \leq 36$. Moreover, the archival life is longer than 300 hours if the composition satisfies the following conditions.

$x+w-22 \leq s/5 \leq x+w-20$.

In the case where the composition of the protective layer is changed from $Cr_2O_3$ to a nitride, "s" represents the total amount of nitrogen in the protective layer (adjacent to the recording film) and the interface layer.

In the case where the nitride in the interface layer is replaced by a boride, the above-mentioned relation is established between the amount of Ge (x–w) and the amount of Ag (w) in the recording film, with s representing the amount of boron in the interface layer.

In the case where the nitride in the interface layer is replaced by a carbide, the above-mentioned relation is established between the amount of Ge (x–w) and the amount of Ag (w) in the recording film, with s representing the amount of carbon in the interface layer.

In the case where the nitride in the interface layer is replaced by a silicide, the above-mentioned relation is established between the amount of Ge (x–w) and the amount of Ag (w) in the recording film, with s representing the amount of silicon in the interface layer.

Those items not mentioned in this example are the same as mentioned in Examples 1 and 3.

EXAMPLE 5

[Structure and production]

Figure 9:
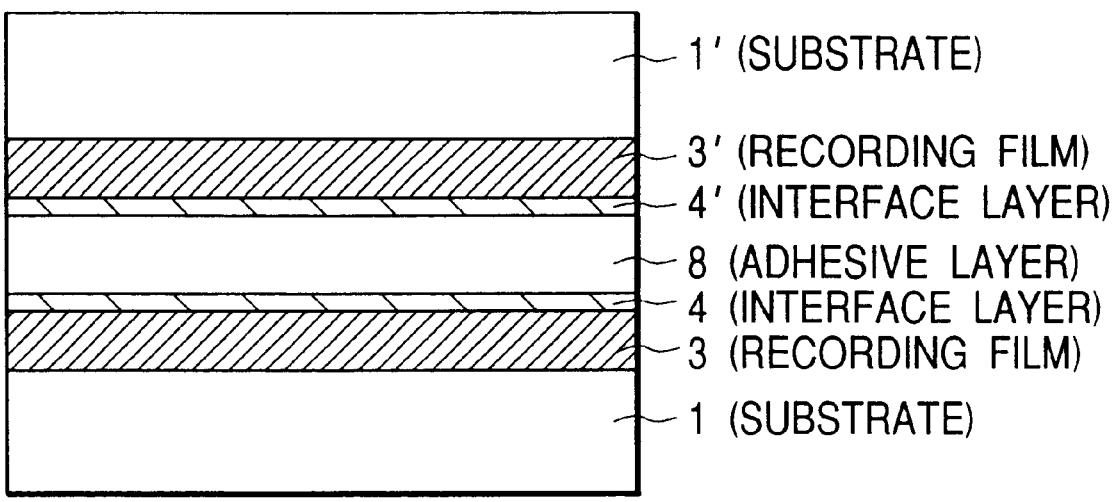
FIG. 9 is a sectional view showing the structure of the information recording medium in Example 4 of the present invention.

A disk-like information recording medium without absorptance control layer was prepared. FIG. 9 shows in section the structure of the disk-like information recording medium. This recording medium was produced as follows.

A polycarbonate substrate 1 was made ready which is 12 cm in diameter and 0.6 mm in thickness and has tracking grooves in its surface. On the substrate the following layers or films were formed in order by means of a magnetron sputtering apparatus.

An approximately 8-nm thick recording film 3 of $Ag_{3.5}Ge_{21}Sb_{22}Te_{53.5}$.

An approximately 90-nm thick interface layer 4 of $(ZnS)_{30}(TaN)_{70}$.

In this way there was obtained a first disk.

The same procedure as above was repeated to give a second disk which has the same structure as the first disk.

The first and second disks were bonded together with an adhesive 8, with the interface layers 4 and 4' facing each other. In this way there was obtained a disk-like information recording medium, as shown in FIG. 9.

[Structure and production of conventional information recording medium]

Figure 10:
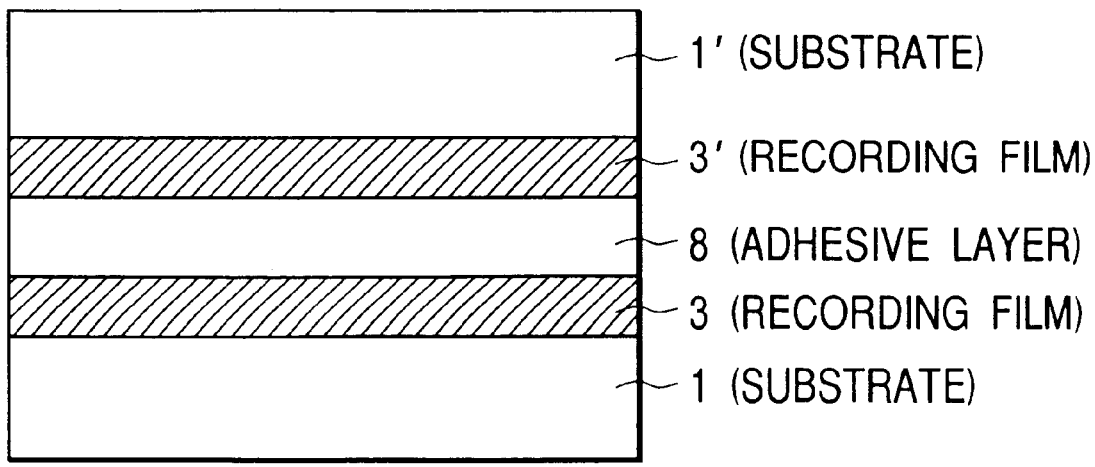
FIG. 10 is a sectional view showing the structure of the conventional information recording medium corresponding to that in Example 4 of the present invention.

The effect of the interface layer was evaluated by comparing the disk-like information recording medium obtained as above with the conventional disk-like information recording medium without interface layer which was prepared as follows. FIG. 10 shows the sectional structure of the conventional information recording medium.

A polycarbonate substrate 1 was made ready which is 12 cm in diameter and 0.6 mm in thickness and has tracking grooves in its surface. On the substrate 1 was formed an approximately 8-nm thick recording film 3 of $Ag_{3.5}Ge_{21}Sb_{22}Te_{53.5}$ by means of a magnetron sputtering apparatus. In this way there was obtained a first disk.

A second disk of the same structure as the first disk was prepared in the same way as above.

The thus obtained two disks were bonded together with an adhesive 8, with the recording films 3 and 3' facing each other, to give the disk-like information recording medium as shown in FIG. 10.

[Recording and reproducing characteristics]

Evaluation of initial crystallization and recording-erasing-reproducing characteristics was carried out in the same was as in Example 1.

The information recording medium in this example was examined for C/N (signal wave to carrier wave) after repeated recording and erasing, and the result of 40 dB was obtained. It was inferior in recording-reproducing characteristics to the information recording media in Examples 1 and 2. However, it was capable of overwriting about 100 times.

The disk E (shown in FIG. 9) having the interface layer and the conventional disk F (shown in FIG. 10) having no interface layer were examined for reproducing archival life (A—R) and overwriting archival life (A—OW) in terms of change in C/N. ). The archival life was measured by accelerated test, with the temperature kept constant at 90° C. The results are shown below.

| Accelerated test Time (h) | Disk E | | Disk F | |
|---|---|---|---|---|
| | C/N of A–R (dB) | C/N of A–OW (dB) | C/N of A–R (dB) | C/N of A–OW (dB) |
| 0 | 40 | 40 | 38 | 38 |
| 1 | 40 | 40 | 38 | 38 |
| 3 | 40 | 40 | 38 | 37 |
| 5 | 40 | 40 | 37 | 36 |
| 8 | 40 | 40 | 35 | 34 |
| 10 | 39 | 40 | 32 | 30 |

It is noted that the interface layer prevents the decrease of C/N even in the environment of accelerated test, thereby greatly improving the archival life.

The disk constructed as shown in FIG. 9 may be provided with a protective layer. The protected recording layer decreases in jitter at the time of rewriting and produces larger signals due to optical interference, thereby improving C/N by 5 dB or more. The disk may also be provided with the reflective layer. The resulting disk permits the number of times of overwrite to increase by one order of magnitude or more owing to the accelerated cooling at the time of recording. The disk may also be provided with intermediate layer. The resulting disk improves in C/N by about 2 dB because of effective use of optical interference. As mentioned above, if the number of layers is reduced, it is possible to reduce the time required for production. However, the resulting disk is limited in recording-reproducing characteristics. In contrast, if the number of layers is increased, the time required for production increases. However, the resulting disk greatly improves in recording-reproducing characteristics.

Those items not mentioned in this example are the same as mentioned in Examples 1 to 4.

As mentioned above, the information recording medium of the present invention is composed of a recording layer (formed on a substrate) to record information by means of the change in atomic arrangement induced by irradiation with light, and at least one interface layer formed at the interface of recording layer. This information recording medium suppresses jitter ($\sigma$/Tw) more than the conventional information recording medium without interface layer this is because the interface layer prevents the recording film from deterioration.

The interface layer is formed from a material in which N accounts for more than 10 atom % of the total number of atoms. It contributes to the archival life.

The absorptance control layer keeps the absorptance of the recording film at Ac>Aa. It decreases incomplete erasure.

The protective layer is placed between the recording film and the substrate. It protects the recording film and increases C/N. The reflective layer increases the number of times of rewriting. The intermediate layer improves C/N.

What is claimed is:

1. An information recording medium which comprises a recording layer on a substrate to record information by means of the change in atomic arrangement induced by irradiation with light, said recording layer having at least one interface layer laminated at its interface, wherein said recording medium has a track pitch $D_{tp}$ which is related with the wavelength $\lambda$ of laser for recording and the numerical aperture NA of the objective as follows:

$$0.5\lambda/NA \leq D_{tp} \leq 0.6\lambda/NA.$$

2. An information recording medium as defined in claim 1, wherein the interface layer contains nitrogen whose amount accounts for more than 10 atom % of the total atoms therein.

3. An information recording medium as defined in claim 1, which further comprises one protective layer between the substrate and said recording layer.

4. An information recording medium as defined in claim 1, wherein said medium has an absorptance control layer at the opposite side of the incident side.

5. An information recording medium as defined in claim 4, wherein the absorptance control layer has a thickness in the range of 10 nm to 50 nm.

6. An information recording medium as defined in claim 4, wherein the absorptance control layer is made of a material having a refractive index (n) of 1.2 to 6 and an attentuation factor (k) of 0.3 to 3.0.

7. An information recording medium as defined in claim 4, wherein the reflectivity of crystalline state is lower than that of amorphous state, and it needs a minimum power to be able to record a minimum mark in its amorphous state which is equal to or smaller than a minimum power to be able to record a minimum mark it its crystalline state under the same conditions.

8. An information recording medium as defined in claim 4, wherein the interface layer contains a component identical with that of the absorptance control layer, said component being composed of more than 50% of the total number of atoms.

9. An information recording medium as defined in claim 4, wherein said medium comprises at least one reflective layer made of Cu alloy, Al alloy, or Au alloy on the absorptance control layer.

10. An information recording medium as defined in claim 4, which has at least one intermediate layer between the recording layer and the absorptance control layer.

11. An information recording medium as defined in claim 1, wherein said interface layer has a composition represented by $N_s Z_t$, where $0.10 \leq s \leq 0.66$ and $s+t=1$, and Z denotes one or more members selected from H, Li, Na, K, Rb, Cs, Be, Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, B, Al, Ga, In, Tl, C, Si, Ge, Sn, Pb, P, As, Sb, Bi, O, S, Se, Te, F, Cl, and Br, and said recording layer has a composition represented by $$Ge_{x-w}Sb_y Te_z M_w,$$

where $0.15 \leq x \leq 0.46$, $0.10 \leq y \leq 0.29$, $0.50 \leq x \leq 0.60$, $w \leq 0.10$ and $x+y+z=1$, and M is one member selected from Na, Mg, Al, P, S, Cl, Li, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Ag, Cr, W, Mo, Pt, Co, Ni, Pd, Si, Au, Cu, V, Mn, Fe, Ti, and Bi, where $$x+w-23 \leq s/5 \leq x+w-19, 22 \leq x+w \leq 36, \text{ and } 10 \leq s.$$

12. An information recording apparatus having a laser and an objective lens to make a record on the information recording medium defined in claim 4, which is characterized by that the information recording medium has a track pitch $D_{tp}$ which is related with the wavelength $\lambda$ of laser for recording and the numerical aperture NA of the objective lens as follows $$0.5\lambda/NA \leq D_{tp} 0.6\lambda/NA.$$

* * * * *